US011671252B2

(12) United States Patent
Hakim

(10) Patent No.: US 11,671,252 B2
(45) Date of Patent: Jun. 6, 2023

(54) SYSTEM AND METHOD FOR INTERNAL ETCHING SURFACES OF TRANSPARENT MATERIALS WITH INFORMATION PERTAINING TO A BLOCKCHAIN

(71) Applicant: EllansaLabs Inc., Addison, TX (US)

(72) Inventor: Omar Besim Hakim, Addison, TX (US)

(73) Assignee: EllansaLabs Inc., Addison, TX (US)

( * ) Notice: Subject to any disclaimer, the term of this patent is extended or adjusted under 35 U.S.C. 154(b) by 0 days.

(21) Appl. No.: 17/863,122

(22) Filed: Jul. 12, 2022

(65) Prior Publication Data

US 2022/0376896 A1 Nov. 24, 2022

Related U.S. Application Data

(63) Continuation of application No. 17/725,008, filed on Apr. 20, 2022.

(51) Int. Cl.
*H04L 9/08* (2006.01)
*G06V 30/19* (2022.01)
*H04L 9/30* (2006.01)

(52) U.S. Cl.
CPC .............. *H04L 9/088* (2013.01); *G06V 30/19* (2022.01); *H04L 9/30* (2013.01)

(58) Field of Classification Search
USPC ........ 713/171, 150, 163, 181; 726/2, 21, 36; 380/255, 264, 276
See application file for complete search history.

(56) References Cited

U.S. PATENT DOCUMENTS 7,204,428 B2 4/2007 Wilson
7,537,877 B2 5/2009 Yoshiba et al.
(Continued)

FOREIGN PATENT DOCUMENTS

CN 105539248 A 5/2016
CN 107480745 A 12/2017
(Continued)

OTHER PUBLICATIONS

OPSYDIA.com; Securing the Identity of Diamonds, Mar. 2022 (downloaded Jul. 12, 2022).
(Continued)

*Primary Examiner* — Sharif E Ullah
(74) *Attorney, Agent, or Firm* — Dickinson Wright PLLC

(57) ABSTRACT

In one embodiment, a system including a tangible token comprising a single integrated transparent gemstone produced by fusing together a first transparent gemstone and a second transparent gemstone, a first internal side of the first transparent gemstone is etched with information pertaining to a blockchain, and the information comprises at least a private key, a public key, and an address, the first internal side of the first transparent gemstone is aligned with a second internal side of the second transparent gemstone, and the aligning encapsulates the information within a perimeter of the second internal side such that the information does not extend beyond the perimeter. The system includes a computing device that executes instructions to: read the information, validate, via a network and the address, the public key and private key are associated with the blockchain, and present an indication of whether or not the information is validated.

28 Claims, 11 Drawing Sheets

(56) References Cited

U.S. PATENT DOCUMENTS

| | | | |
|---|---|---|---|
| 7,773,749 | B1 | 8/2010 | Durst et al. |
| 8,851,372 | B2 | 10/2014 | Zhou et al. |
| 9,239,414 | B2* | 1/2016 | Rey .................. B44C 1/04 |
| 9,269,576 | B2 | 2/2016 | Yamauchi et al. |
| 10,281,398 | B2 | 5/2019 | Zheng et al. |
| 10,471,478 | B2 | 11/2019 | Gil |
| 10,603,685 | B2 | 3/2020 | Zheng et al. |
| 10,620,121 | B2 | 4/2020 | Zheng et al. |
| 11,484,011 | B2 | 11/2022 | Chapman |
| 11,488,122 | B2 | 11/2022 | Diamond et al. |
| 2003/0120613 | A1 | 6/2003 | Neogi |
| 2004/0112087 | A1 | 6/2004 | Bishop |
| 2010/0018955 | A1* | 1/2010 | Martinez .......... G11B 7/1378 |
| | | | 219/121.68 |
| 2010/0310839 | A1* | 12/2010 | Rey .................. B44C 1/04 |
| | | | 216/33 |
| 2012/0120465 | A1* | 5/2012 | Martinez ............ G03H 1/08 |
| | | | 219/121.2 |
| 2012/0167210 | A1 | 6/2012 | Oro Garcia et al. |
| 2015/0213734 | A1 | 7/2015 | Glickman |
| 2016/0099852 | A1 | 4/2016 | Cook et al. |
| 2016/0275585 | A1 | 9/2016 | Scoggins |
| 2016/0300234 | A1 | 10/2016 | Moss-Pultz et al. |
| 2018/0109494 | A1 | 4/2018 | Yu et al. |
| 2018/0293474 | A1 | 10/2018 | Almog |
| 2019/0114698 | A1 | 4/2019 | Lutnick et al. |
| 2019/0130100 | A1 | 5/2019 | Dymshits et al. |
| 2019/0355037 | A1 | 11/2019 | Desai |
| 2019/0378145 | A1 | 12/2019 | Mayer |
| 2020/0076786 | A1 | 3/2020 | Spivack et al. |
| 2020/0145454 | A1 | 5/2020 | Galliano et al. |
| 2020/0246681 | A1 | 8/2020 | Chen |
| 2021/0027447 | A1* | 1/2021 | Parikh ............... G01N 21/87 |
| 2021/0160235 | A1 | 5/2021 | Lerner |
| 2021/0287288 | A1* | 9/2021 | Madisetti .......... H04L 9/14 |
| 2021/0358004 | A1 | 11/2021 | Chang et al. |
| 2021/0390531 | A1 | 12/2021 | Voorhees et al. |
| 2022/0254174 | A1 | 8/2022 | Hong |
| 2023/0016065 | A1 | 1/2023 | Diamond |

FOREIGN PATENT DOCUMENTS

| | | | |
|---|---|---|---|
| CN | 109903135 | A | 6/2019 |
| CN | 210579489 | U | 5/2020 |
| CN | 112908147 | A | 6/2021 |
| DE | 202017105345 | U1 | 9/2017 |
| DE | 102019217511 | A1 | 5/2021 |
| DE | 102020120669 | A1 | 2/2022 |
| EP | 2172933 | A1 | 4/2010 |
| EP | 3305461 | A1 | 4/2018 |
| EP | 3671674 | A1 | 6/2020 |
| EP | 3886031 | A1 | 9/2021 |
| EP | 4102399 | A1 | 12/2022 |
| FR | 3021325 | A1 | 11/2015 |
| FR | 3084848 | A1 | 2/2020 |
| IN | 29/2016 | | 7/2016 |
| JP | 2004086828 | A | 3/2004 |
| JP | 2016022308 | A | 2/2016 |
| KR | 100344886 | B1 | 7/2002 |
| KR | 20050027336 | A | 3/2005 |
| KR | 20090123356 | A | 12/2009 |
| KR | 20130001757 | A | 1/2013 |
| KR | 20130140404 | A | 12/2013 |
| KR | 101476264 | B1 | 12/2014 |
| KR | 101734534 | B1 | 5/2017 |
| KR | 20170116509 | A | 10/2017 |
| KR | 20190049187 | A | 5/2019 |
| KR | 20190108435 | A | 9/2019 |
| KR | 20190108441 | A | 9/2019 |
| KR | 102052735 | B1 | 12/2019 |
| KR | 102052736 | B1 | 12/2019 |
| KR | 102060972 | B1 | 12/2019 |
| KR | 20190139170 | A | 12/2019 |
| KR | 20200015650 | A | 2/2020 |
| KR | 20200054122 | A | 5/2020 |
| KR | 20200060311 | A | 5/2020 |
| KR | 20200065307 | A | 6/2020 |
| KR | 20200071802 | A | 6/2020 |
| KR | 20200095282 | A | 8/2020 |
| KR | 102152449 | B1 | 9/2020 |
| KR | 20200106140 | A | 9/2020 |
| KR | 20200113602 | A | 10/2020 |
| KR | 20200131196 | A | 11/2020 |
| KR | 102207713 | B1 | 1/2021 |
| KR | 20210005837 | A | 1/2021 |
| KR | 20210005838 | A | 1/2021 |
| KR | 20210015495 | A | 2/2021 |
| KR | 102286977 | B1 | 8/2021 |
| KR | 20210098900 | A | 8/2021 |
| KR | 102473589 | B1 | 12/2022 |
| PL | 0906398-6 | A2 | 8/2011 |
| RU | 2750068 | C1 | 6/2021 |
| TW | 200536733 | A | 11/2005 |
| TW | M508306 | U | 9/2015 |
| TW | M534739 | U | 1/2017 |
| TW | 201743243 | A | 12/2017 |
| TW | 202236418 | A | 9/2022 |
| WO | 2009092794 | A2 | 7/2009 |
| WO | 2010081986 | A1 | 7/2010 |
| WO | 2012048510 | A1 | 4/2012 |
| WO | 2015125134 | A1 | 8/2015 |
| WO | 2016124176 | A1 | 8/2016 |
| WO | 2017145004 | A1 | 8/2017 |
| WO | 2019088358 | A1 | 5/2019 |
| WO | 2019177184 | A1 | 9/2019 |
| WO | 2020096097 | A1 | 5/2020 |
| WO | 2020101097 | A1 | 5/2020 |
| WO | 2020105752 | A1 | 5/2020 |
| WO | 2021075651 | A2 | 4/2021 |
| WO | 2021095795 | A1 | 5/2021 |
| WO | 2021155054 | A1 | 8/2021 |
| WO | 2021209952 | A1 | 10/2021 |
| WO | 2022127759 | A1 | 6/2022 |
| WO | 2022224044 | A1 | 10/2022 |
| WO | 2022243840 | A1 | 11/2022 |

OTHER PUBLICATIONS

International Search Report and Written Opinion for PCT Application No. PCT/US2022/048070, dated Mar. 6, 2023, 10 pages.
International Search Report and Written Opinion for PCT Application No. PCT/US2022/036842, dated Jan. 16, 2023, 12 pages.
International Search Report and Written Opinion for PCT Application No. PCT/US2022/025591, dated Jan. 18, 2023, 20 pages.
Tharaka Hewa et al., "Survey on Blockchain based Smart Contracts: Applications, Opportunities and Challenges" Journal of Network and Computer Applications, Sep. 21, 2020, 56 pages.

* cited by examiner

SYSTEM AND METHOD FOR INTERNAL ETCHING SURFACES OF TRANSPARENT MATERIALS WITH INFORMATION PERTAINING TO A BLOCKCHAIN

CROSS-REFERENCE TO RELATED APPLICATIONS

This application is a continuation of and claims priority to U.S. Utility application Ser. No. 17/725,008, filed Apr. 20, 2022, titled "SYSTEM AND METHOD FOR ETCHING INTERNAL SURFACES OF TRANSPARENT GEMSTONES WITH INFORMATION PERTAINING TO A BLOCKCHAIN," the entire disclosure of which is hereby incorporated by reference for all purposes.

TECHNICAL FIELD

This disclosure relates to a blockchain. More specifically, this disclosure relates to a system and method for etching internal surfaces of transparent gemstones with information pertaining to a blockchain.

BACKGROUND

A blockchain is a distributed database that maintains a continuously-growing list of records, called blocks, that may be linked together to form a chain. Each block in the blockchain may contain a timestamp and a link to a previous block and/or record. The blocks may be secured from tampering and revision. In addition, a blockchain may include a secure transaction ledger database shared by parties participating in an established, distributed network of computers. A blockchain may record a transaction (e.g., an exchange or transfer of information) that occurs in the network, thereby reducing or eliminating the need for trusted/centralized third parties. In some cases, the parties participating in a transaction may not know the identities of any other parties participating in the transaction but may securely exchange information. Further, the distributed ledger may correspond to a record of consensus with a cryptographic audit trail that is maintained and validated by a set of independent computers. A blockchain may store a cryptocurrency and/or a non-fungible token.

SUMMARY

In one embodiment, a system includes a tangible token and a computing device. The tangible token includes a transparent gemstone. The transparent gemstone is internally etched with information pertaining to a blockchain. The information includes at least a private key, a public key, and an address. The information is encapsulated within a perimeter of the transparent gemstone such that the information does not extend beyond the perimeter. The computing device is configured to execute instructions that cause the computing device to read the information. The instructions also cause the computing device to validate, via a network and the address, the public key and the private key are associated with at least one block on the blockchain. The instructions further cause the computing device to present an indication of whether or not the information is validated.

In one embodiment, a method includes internally etching, within a transparent gemstone, machine-readable information pertaining to a blockchain. The information includes at least a private key, a public key and an address of the blockchain. The method also includes reading, using a sensor of a computing device, the machine-readable information. The method further includes validating, via a network and the address, that the public key and the private key are associated with at least one block on the blockchain. The method also includes presenting an indication that the information is validated.

In one embodiment, a tangible, non-transitory computer-readable medium storing instructions that, when executed, cause a processing device to internally etch, within a transparent gemstone, machine-readable information pertaining to a blockchain. The information includes at least a private key, a public key and an address of the blockchain. The instructions also cause the processing device to read, using a sensor, the machine-readable information. The instructions further cause the processing device to validate, via a network and the address, that the public key and the private key are associated with at least one block on the blockchain. The instructions also cause the processing device to present an indication that the information is validated.

In one embodiment, a method includes etching, on a first internal side of a first transparent gemstone, information pertaining to a blockchain. The information includes at least a private key. The method includes aligning the first internal side of the first transparent gemstone with a second internal side of a second transparent gemstone. The aligning encapsulates the information within a perimeter of the second internal side such that the information does not extend beyond the perimeter. The method includes fusing the first transparent gemstone and the second transparent gemstone together to create a single integrated transparent gemstone.

In one embodiment of the method, the information comprises a public key and an address of the blockchain.

In one embodiment of the method, the information is machine-readable and the method includes inserting the single integrated transparent gemstone into a computing device configured to execute instructions that cause the computing device to read the information, validate, via a network and the address, the public key and private key are associated with at least one block on the blockchain, and present an indication of whether or not the information is validated.

In one embodiment of the method, the computing device is configured to use optical character recognition to read the information.

In one embodiment of the method, the single integrated transparent gemstone comprises sapphire.

In one embodiment of the method, the single integrated transparent gemstone comprises a one-inch disk, a two-inch disk, a three-inch disk, or a four-inch disk.

In one embodiment of the method, the information pertains to a non-fungible token stored on the blockchain.

In one embodiment of the method, the information pertains to a cryptocurrency stored on the blockchain.

In one embodiment of the method, the information further comprises a graphic design, text content, an image, a logo, a symbol, a character, or some combination thereof.

In one embodiment of the method, the method may include attaching the single integrated transparent gemstone to a piece of jewelry.

In one embodiment of the method, the information is machine-readable and the method includes inserting the single integrated transparent gemstone into a computing device configured to execute instructions that cause the computing device to: read the information, access, via a network and using the information, a non-fungible token associated with the information on the blockchain, and project, on a surface, an image associated with the non-fungible token accessed on the blockchain.

In one embodiment of the method, the method may include sealing the single integrated transparent gemstone in an opaque material such that the information is not visible.

In one embodiment of the method, the information is associated with an indivisible block of cryptocurrency stored on the blockchain, wherein the indivisible block represents a number of units of the cryptocurrency, and the information further comprises an identifier associated with the cryptocurrency.

In one embodiment of the method, the number of units are associated with a principle value, and the method further comprises: using a processing device to generate interest on the principle value, and storing the interest in an interest digital wallet separate from a principle digital wallet storing information pertaining to the principle value.

In one embodiment of the method, the indivisible block of cryptocurrency on the blockchain is registered to a first owner, and the method further comprises using a processing device to transfer ownership of the indivisible block of cryptocurrency on the blockchain to a second owner.

In one embodiment of the method, the private key has a size of greater than 0.1 millimeter.

In one embodiment of the method, the private key has a size of less than 0.1 millimeter.

In one embodiment of the method, the information further comprises a barcode, a quick response code, or both.

In one embodiment, a system includes a tangible token comprising a single integrated transparent gemstone. The single integrated transparent gemstone is produced by fusing together a first transparent gemstone and a second transparent gemstone, a first internal side of the first transparent gemstone is etched with information pertaining to a blockchain, and the information comprises at least a private key. A public key, and an address. The first internal side of the first transparent gemstone is aligned with a second internal side of the second transparent gemstone. The aligning encapsulates the information within a perimeter of the second internal side such that the information does not extend beyond the perimeter. The system also includes a computing device configured to execute instructions that cause the computing device to: read the information, validate, via a network and the address, the public key and private key are associated with at least one block on the blockchain, and present an indication of whether or not the information is validated.

In one embodiment of the system, the computing device is configured to use optical character recognition to read the information.

In one embodiment of the system, the single integrated transparent gemstone comprises sapphire.

In one embodiment of the system, the single integrated transparent gemstone comprises a one-inch disk, a two-inch disk, a three-inch disk, or a four-inch disk.

In one embodiment of the system, the information pertains to a non-fungible token stored on the blockchain.

In one embodiment of the system, the information pertains to a cryptocurrency stored on the blockchain.

In one embodiment of the system, the information further comprises a graphic design, text content, an image, a logo, a symbol, a character, or some combination thereof.

In one embodiment of the system, further comprising attaching the single integrated transparent gemstone to a piece of jewelry.

In one embodiment of the system, the computing device is configured to execute the instructions to: read the information, access, via the network and using the information, a non-fungible token associated with the information on the blockchain, and project, on a surface, an image associated with the non-fungible token accessed on the blockchain.

In one embodiment of the system, further comprising sealing the single integrated transparent gemstone in an opaque material such that the information is not visible.

In one embodiment of the system, the information is associated with an indivisible block of cryptocurrency stored on the blockchain, wherein the indivisible block represents a number of units of the cryptocurrency, and the information further comprises an identifier associated with the cryptocurrency.

In one embodiment of the system, the number of units are associated with a principle value, and the method further comprises: using a processing device to generate interest on the principle value; and storing the interest in an interest digital wallet separate from a principle digital wallet storing information pertaining to the principle value.

In one embodiment of the system, the indivisible block of cryptocurrency on the blockchain is registered to a first owner, and the method further comprises using a processing device to transfer ownership of the indivisible block of cryptocurrency on the blockchain to a second owner.

In one embodiment of the system, the private key has a size of greater than 0.1 millimeter.

In one embodiment of the system, the private key has a size of less than 0.1 millimeter.

In one embodiment of the system, the information further comprises a barcode, a quick response code, or both.

In one embodiment, a computing device includes a memory device storing instructions, and a reading component configured to obtain an image of a tangible token. The tangible token includes a single integrated transparent gemstone including information etched internally within the single integrated transparent gemstone. The computing device includes a processing device communicatively coupled to the memory device and the reading component. The processing device is configured to execute the instructions to receive the image of the tangible token from the reading component, and analyze the image to obtain the information associated with the tangible token. The information includes a public key associated with a block on a blockchain, a private key associated with the block on the blockchain, and an address of the block on the blockchain. The processing device is configured to validate, via a network and the address, the public key and private key are associated with the block on the blockchain, to present an indication of whether or not the information is validated, and to project at least a portion of the information on a surface.

In one embodiment of the computing device, the computing device is configured to use optical character recognition to read the information.

In one embodiment of the computing device, the single integrated transparent gemstone comprises sapphire.

In one embodiment of the computing device, the single integrated transparent gemstone comprises a one-inch disk, a two-inch disk, a three-inch disk, or a four-inch disk.

In one embodiment of the computing device, the information pertains to a non-fungible token stored on the blockchain.

In one embodiment of the computing device, the information pertains to a cryptocurrency stored on the blockchain.

In one embodiment of the computing device, the information further comprises a graphic design, text content, an image, a logo, a symbol, a character, or some combination thereof.

In one embodiment of the computing device, further comprising attaching the single integrated transparent gemstone to a piece of jewelry.

In one embodiment of the computing device, the processing device is configured to: read the information, access, via the network and using the information, a non-fungible token associated with the information on the blockchain, and project, on a surface, an image associated with the non-fungible token accessed on the blockchain.

In one embodiment of the computing device, further comprising sealing the single integrated transparent gemstone in an opaque material such that the information is not visible.

In one embodiment of the computing device, the information is associated with an indivisible block of cryptocurrency stored on the blockchain, wherein the indivisible block represents a number of units of the cryptocurrency, and the information further comprises an identifier associated with the cryptocurrency.

In one embodiment of the computing device, the number of units are associated with a principle value, and the method further comprises: using a processing device to generate interest on the principle value; and storing the interest in an interest digital wallet separate from a principle digital wallet storing information pertaining to the principle value.

In one embodiment of the computing device, the indivisible block of cryptocurrency on the blockchain is registered to a first owner, and the method further comprises using a processing device to transfer ownership of the indivisible block of cryptocurrency on the blockchain to a second owner.

In one embodiment of the computing device, the private key has a size of greater than 0.1 millimeter.

In one embodiment of the computing device, the private key has a size of less than 0.1 millimeter.

In one embodiment of the computing device, the information further comprises a barcode, a quick response code, or both.

Other technical features may be readily apparent to one skilled in the art from the following figures, descriptions, and claims.

BRIEF DESCRIPTION OF THE DRAWINGS

For a detailed description of example embodiments, reference will now be made to the accompanying drawings in which.

NOTATION AND NOMENCLATURE

Figure 1:
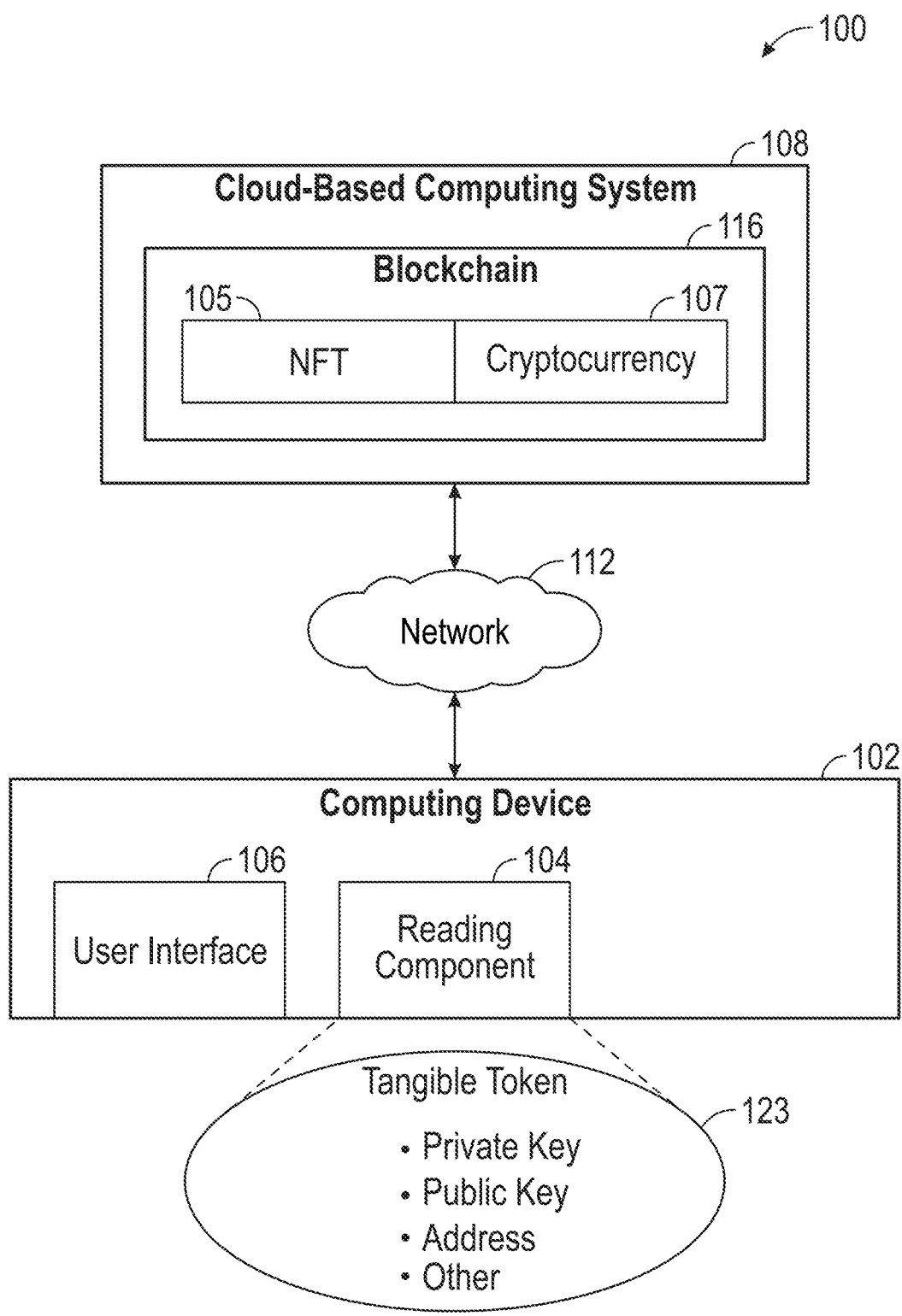
FIG. 1 illustrates a system architecture according to certain embodiments of this disclosure.

Various terms are used to refer to particular system components. Different entities may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

The terminology used herein is for the purpose of describing particular example embodiments only, and is not intended to be limiting. As used herein, the singular forms "a," "an," and "the" may be intended to include the plural forms as well, unless the context clearly indicates otherwise. The method steps, processes, and operations described herein are not to be construed as necessarily requiring their performance in the particular order discussed or illustrated, unless specifically identified as an order of performance. It is also to be understood that additional or alternative steps may be employed.

The terms first, second, third, etc. may be used herein to describe various elements, components, regions, layers and/or sections; however, these elements, components, regions, layers and/or sections should not be limited by these terms. These terms may be only used to distinguish one element, component, region, layer or section from another region, layer or section. Terms such as "first," "second," and other numerical terms, when used herein, do not imply a sequence or order unless clearly indicated by the context. Thus, a first element, component, region, layer or section discussed below could be termed a second element, component, region, layer or section without departing from the teachings of the example embodiments. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. In another example, the phrase "one or more"

when used with a list of items means there may be one item or any suitable number of items exceeding one.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), solid state drives (SSDs), flash memory, or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

The term "tangible token" may refer to a physical object that includes information etched or provided internally within the physical object, and the physical object is at least partially transparent such that the information may be read.

The term "tangible token" and "single integrated transparent gemstone" may be used interchangeably herein.

A "private key" may refer to a cryptographic large, randomly-generated number with multiple digits represented as a string of alphanumeric characters. The private key may be used to sign transactions and to prove ownership of a blockchain address. The private key may encrypt and decrypt data.

A "public key" may refer to a cryptographic key that can be obtained and used by anyone to encrypt messages intended for a particular recipient, such that the encrypted messages can be deciphered only by using a second key that is known only to the recipient, e.g., having the private key.

A "digital wallet" may consist of a set of public addresses and private keys. Any device may deposit cryptocurrency in a public address, but funds cannot be removed from an address without the corresponding private key.

A "blockchain" may refer to a distributed database that maintains a continuously-growing list of records, called blocks, that may be linked together to form a chain.

A "blockchain system" may refer to a group of nodes that cooperate to maintain and build a blockchain according to a protocol.

A "node" may refer to a computing device participating in the blockchain system and that is connected to and interacts with the blockchain.

A "hash" may refer to an output of a cryptographic function used in securing information in a blockchain.

A "consensus algorithm" may refer to a process used to achieve approval or agreement on a single data value in a distributed system.

The term "feedback loop" may refer to a mutually dependent relationship between two parties in a given system.

The term "proof of work" may refer to a cryptographic process to ensure data security and/or uniformity.

The term "transparent" or "transparency" may refer to a property of a gemstone or material that enables at least some information (e.g., etching, laser mark, engraving, etc.) included within the gemstone or material to be visible. In some embodiments, the information may not be visible to the naked eye (e.g., less than 0.1 millimeter in size). In some embodiments, the information may be visible to the naked eye (e.g., greater than 0.1 millimeters in size).

A "proof of record" may refer to a compression process using the consensus algorithm designed to create a tiered, access-oriented, and adjustable blockchain architecture used by the blockchain system described herein.

The term "SHA" may refer to Secure Hash Algorithm.

The term "SHA-2" may refer to a set of cryptographic hash functions designed by the United States National Security Agency.

The term "SHA256" may refer to a member of the SHA-2 cryptographic hash functions and may generate an almost-unique 256-bit data signature.

DETAILED DESCRIPTION

The following discussion is directed to various embodiments of the disclosed subject matter. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

FIGS. 1 through 10, discussed below, and the various embodiments used to describe the principles of this disclosure in this patent document are by way of illustration only and should not be construed in any way to limit the scope of the disclosure.

Blockchains may refer to a distributed ledger maintained by and stored on one or more computing devices in a decentralized fashion. A blockchain may provide access to immutable records of information. Blockchains may be published to the public. A blockchain may be stored on numerous computing devices connected via a network in a cloud-based computing system. Accordingly, since numerous computing devices (e.g. nodes) may alter the blockchain (e.g., by adding a new block), security is an important consideration when implementing a blockchain. Conventionally, to secure the blockchain, a proof of work is used that ensures reliable evidence that a significant amount of processing resources (such as time and/or processing resources) was used during the creation of a new block to be added to the blockchain. The Bitcoin implementation of blockchain requires a node to use processing resources to find a nonce value that, when hashed with the rest of a block header, results in a hash value which has a predetermined number of leading zeroes.

Also, some blockchain technologies, like Bitcoin, provide blockchains directly to all the participating nodes in a blockchain system. The blockchains may continue to grow in size as nodes add blocks for an unrestricted amount of time. There are different kinds of blockchains, such as permission-less and permissioned. In a permission-less blockchain, any entity may participate without an identity. In a permissioned blockchain, each entity that participates in the blockchain is identified and known. An example of a permissioned blockchain is a distributed ledger (e.g., a hyperledger). The permissions cause the participating nodes to view only the appropriate records of transactions in the distributed ledger. Programmable logic may be implemented as rules and/or smart contracts that are executed on the distributed ledger. In some embodiments, the rules may be analytics-based and may specify scenarios when updates to the distributed ledger are to be made. Using the analytics-based rules may make each node an active participant by updating the distributed ledger at specified times.

A smart contract may refer to a computer protocol with one or more functions capable of digitally facilitating, verifying, and/or assisting with transactions associated with the blockchain. The smart contract may include a function configured to authorize and/or authenticate a transaction request made by a user, a function configured to add content to the distributed ledger (e.g., a non-fungible token, a cryptocurrency, and/or the like), a function configured to verify the content of the blockchain, a function configured to allow certain authorized users to view the content of the blockchain, a function configured to incentivize one or more transactions, and/or the like.

A non-fungible token (NFT) may refer to a non-interchangeable unit of data stored on a blockchain that can be sold and/or traded. In some embodiments, types of NFT data units that may be associated with digital files such as digital jewelry model designs, photos, images, videos, and/or audio. NFTs differ from cryptocurrencies, such as Bitcoin, because cryptocurrencies are fungible (interchangeable) and NFTs are non-fungible.

A cryptocurrency is a digital or virtual currency that is secured by cryptography and stored on a blockchain. Cryptocurrency is a form of a digital asset based on a network that is distributed across a large number of computers. Cryptocurrency transactions may be governed via a smart contract that controls transfers. Private keys may be used to sign transactions to enable the cryptocurrency to move from one digital wallet to another digital wallet. A public key may be used by the receiving digital wallet to verify the transfer is valid.

Conventionally, certain items, such as jewelry may be sold to customers. The jewelry may be unique in that it is one of a kind or at least one of a limited number of jewelries having a particular design or designed by a particular jeweler. To add value or make the piece of jewelry more desirable, in some embodiments, an NFT may be created that stores a digital design of the jewelry on a block of a blockchain. The NFT's information may be etched internally on a gemstone and the gemstone may be provided to the customer that bought the piece of jewelry. The NFT information may include an address of where the NFT is located on the blockchain and may include a public key and a private key to verify ownership and the transaction that occurred when the customer bought the jewelry. In some embodiments, the information may be etched at a size that is not visible to the naked eye (e.g., less than 0.1 millimeter). However, using a magnifying glass or a microscope, for example, a user may read the information that is inscribed or etched internally within the gemstone. In some embodiments, the information etched on the gemstone may be partially or completely obscured with a bezel (e.g., gold) around an outer edge of the gemstone. In some embodiments, a graphic inscribed or etched internally on the inside of the gemstone may be visible when the bezel is obscuring the information. In order to view all of the blockchain information, the bezel may be damaged or removed to view all of the blockchain information etched on the gemstone. Such a technique may enable the gemstone to be circulated without someone casually reading the blockchain information. The gemstone may be a sapphire, diamond, emerald, jade, amethyst, pearl, amber, rose quartz, turquoise, moonstone, or the like. The gemstones may be structurally resilient and may not decade or degrade for thousands of years. Thus, the information included with the gemstones may be preserved for thousands of years. The gemstone may be referred to as a tangible token and/or a single integrated transparent gemstone herein.

In some embodiments, more than one wafer (e.g., gemstone wafer) may be used to create a single integrated transparent gemstone. In some embodiments, a sapphire wafer may be shaped like a disk, which may be 1 inch, 2 inches, 3 inches, 4 inches, etc. A first sapphire wafer may include an internal side and an external side. The internal side of the first sapphire wafer may be laser etched (e.g., via a lithological process) to include various information, such as a private key to a block storing an NFT or a cryptocurrency, a public key to the block on the blockchain, an address of the block on the blockchain, an image associated with the block on the blockchain, among other things.

The information may be etched, engraved, indented, and/or marked on the internal side of the first sapphire wafer. For example, a machine including a laser may be used to etch the information onto the internal side of the wafer by melting a surface of the internal side to correspond to the information (e.g., melts the alphanumeric characters of the private key, the public key, and/or the address). A second sapphire wafer may be aligned with the first sapphire wafer such that the information included on the internal side of the first sapphire wafer is encapsulated between the first and second sapphire wafers. That is, the information does not extend beyond a perimeter created by the aligned first and second sapphire wafers. The two sapphire wafers may be fused together such that the information is hermetically sealed between the two wafers. A flame fusion process may be used, for example, to fuse two sapphire wafers together. In some embodiments, fusing the two sapphire wafers may include bonding by molecular adhesion.

Either or both of the first and second sapphire wafers may be transparent such that the information may be visible to the naked eye or via a magnifying device if the information is etched at a size smaller than the naked eye can visibly detect. The two wafers may be connected by bonding by molecular adhesion. The hermetic seal may form a barrier to diffusion of humidity or gas or liquid chemicals.

In some embodiments, the internal side of the first sapphire wafer may include a recess forming a pattern of a graphical element and/or alphanumeric characters and the recess may be filled with a material. By fusing and/or bonding through molecular adhesion the sapphire wafers together a monolithic structure may be formed that includes the information enclosed internally. Accordingly, the information etched, engraved, indented, and/or marked internally within the single integrated transparent gemstone may be protected from tampering for thousands of years due to the strength and durability properties of the gemstone. To fuse the two wafers together, a mechanism may be used to apply heat and pressure such that the internal sides of each wafer bond with one another and form the hermetic seal. In some embodiments, bonding techniques may be used where the bond is transparent and each surface of the internal sides of the wafers are machined very flat and smooth to enable optimized contact. In some embodiments, a welding process may be used to fuse the two wafers together. In some embodiments, an adhesion layer may be included between the first sapphire wafer and the second sapphire wafer.

In some embodiments, the melting temperature of certain materials for the wafers may be 1,790 degrees Celsius. In some embodiments, a certain material may be selected to be deposited in a recess of the internal side of the first sapphire wafer. The certain material may have a melting temperature of about 1,760 degrees Celsius. After the single integrated transparent gemstone is created, it may have a high resistance to thermal aggression (e.g., fire). Accordingly, the single integrated transparent gemstone may be extremely durable for thousands of years. In some embodiments, by bonding by molecular adhesion, mineral materials may be used, and the optical properties may be stable over time such that the visibility of the information remains constant, continuous, etc. over time.

In some embodiments, the tangible token may be inserted into a computing device. The computing device may include a slot in which the tangible token is deposited and/or the computing device may include a reading component (e.g., sensor, camera, etc.) that is able to identify the tangible token and read the information internally included within the tangible token. The computing device may transmit, via a network, the information to one or more computing devices storing the blockchain to validate whether the information is valid. In some embodiments, the computing device may include a projecting device configured to project any data (e.g., image) associated with the information that is obtained from the blockchain when the information is validated. In some embodiments, the tangible token may be sealed in a material that is opaque and prevents the information from being visible at all. In order to view the information, the material may be cracked, pealed, broken, torn open, etc. such that the material is removed from the tangible token.

Turning now to the figures, FIG. 1 depicts a system architecture 10 according to some embodiments. The system architecture 10 may include one or more computing devices 102 communicatively coupled to a cloud-based computing system 108. The cloud-based computing system 108 may include one or more servers. Each of the computing device 102 and/or servers included in the cloud-based computing system 108 may include one or more processing devices, memory devices, and/or network interface devices. The network interface devices may enable communication via a wireless protocol for transmitting data over short distances, such as Bluetooth, ZigBee, NFC, etc. Additionally, the network interface devices may enable communicating data over long distances, and in one example, the computing device 102 and the cloud-based computing system 108 may communicate with a network 112. Network 112 may be a public network (e.g., connected to the Internet via wired (Ethernet) or wireless (WiFi)), a private network (e.g., a local area network (LAN) or wide area network (WAN)), or a combination thereof. Network 112 may also comprise a node or nodes on the Internet of Things (IoT).

The computing device 102 may be any suitable computing device, such as a laptop, tablet, smartphone, or computer. The computing device 102 may include a display capable of presenting a user interface 106. The user interface 106 may be implemented in computer instructions stored on the one or more memory devices of the cloud-based computing system 108 and/or computing device 102 and may be executable by the one or more processing devices of the cloud-based computing system 108 and/or computing device 102. The user interface 106 may present various screens to a user. For example, the user interface 106 may present a screen that indicates whether information pertaining to a non-fungible token and/or a cryptocurrency is valid or not valid. The user interface 106 may present a screen that indicates that the owner of the non-fungible token and/or cryptocurrency is authorized or not authorized. The user interface 106 may present a screen that displays data associated with a non-fungible token and/or cryptocurrency. For example, the screen may present a digital model of a jewelry design associated with the non-fungible token.

In some embodiments, the user interface 106 is a standalone application installed and executing on the computing device 102. In some embodiments, the user interface 106 (e.g., website) executes within another application (e.g., web browser). The cloud-based computing system 108 and the computing device 102 may also include instructions stored on one or more memory devices that, when executed by the one or more processing devices of the computing device 102 perform operations of any of the methods described herein.

In some embodiments, the cloud-based computing system 108 may include one or more servers that form a distributed computing architecture. The servers may be a rackmount server, a router computer, a personal computer, a portable digital assistant, a mobile phone, a laptop computer, a tablet computer, a camera, a video camera, a netbook, a desktop computer, a media center, any other device capable of functioning as a server, or any combination of the above. Each of the servers may include one or more processing devices, memory devices, data storage, and/or network interface cards. The servers may be in communication with one another via any suitable communication protocol.

The cloud-based computing system 108 may include a blockchain 116. The blockchain 116 may refer to a distributed ledger that is decentralized and controlled by peer-to-peer authorization. For example, to add a block to the blockchain 116, a consensus protocol may be used where more than a threshold (e.g., more than 75%) of the nodes on the blockchain 116 agree to allow a block to be added to the blockchain 116. A node may refer to a computing device (e.g., server) that has an instance of the blockchain 116 stored in memory and/or executed by a processing device.

The blockchain 116 may store one or more blocks that each have a respective address. There may also be private and public keys associated with the blocks and users that perform transactions using their computing devices. Further, each block may be associated with a smart transaction that controls the transactions and records each and every transaction in the blockchain 116. In some embodiments, the blocks may store NFTs 105. The NFTs 105 may further store images, audio, video, or the like. In one example, the NFTs 105 may store a digital model of a jewelry design. The blockchain 116 may also include one or more blocks that store a cryptocurrency 107. The cryptocurrency may be associated with a number of units and an identifier for the cryptocurrency. Both the NFTs 105 and the cryptocurrency 107 may include metadata associated with an owner of the NFTs 105 and the cryptocurrency 107. In some embodiments, any information associated with the NFTs and/or the cryptocurrency 107 may be stored as metadata in the respective block of the blockchain 116.

As depicted, a tangible token 123 may be manufactured by fusing together two wafers of a gemstone to create a single integrated transparent gemstone. The tangible token 123 may include internally etched information including, but not limited to, at least a private key associated with the blockchain 116 and a user, a public key associated with the blockchain 116 and a user, an address of the blockchain 116, an image, text, or some combination thereof. The address of the blockchain may include a string of text that uniquely identifies the source or destination of a transaction. The blockchain 116 may have an address that is created by a cryptographic operation. The address of a blockchain 116 may function akin to an electronic mail address. It may refer to a specific destination of where a block storing an NFT or a cryptocurrency is located. To that end, using the keys (e.g., private and/or public) data associated with a block at the address may be validated, obtained, authorized, secured, displayed, transferred, etc.

The computing device may include a reading component 104. The reading component 104 may be a sensor and/or a camera. The tangible token 123 may be placed proximately to or touch the reading component 104, and the reading component 104 may perform an operation to read the information included internally within the tangible token 123. For example, the reading component 104 may be a camera and may obtain or stream an image of the tangible token 123. A processing device of the computing device 102 may receive the image and perform optical character recognition to decipher the information that is internally etched within the tangible token 123. The computing device 102 may transmit the information to the cloud-based computing system 108 to obtain data related to the tangible token's 123 private key, public key, and/or address. If the information is validated as belonging to the owner requesting the data, the data may be retrieved from the blockchain 116 and returned to the computing device 102. In some embodiments, a new transaction may be entered for the block that was accessed.

In some embodiments, the tangible token 123 may include a single transparent gemstone. The single transparent gemstone may be produced by etching information pertaining to a blockchain on a gemstone surface during (e.g., in the middle of) a growing process of the gemstone, and the single transparent gemstone may be grown to a state where the information is internally included within the single transparent gemstone such that it is not physically exposed to elements outside an outer surface of the single transparent gemstone. The information may be wholly included within an outer surface perimeter of the single transparent gemstone. The information may include the blockchain information.

Figure 2:
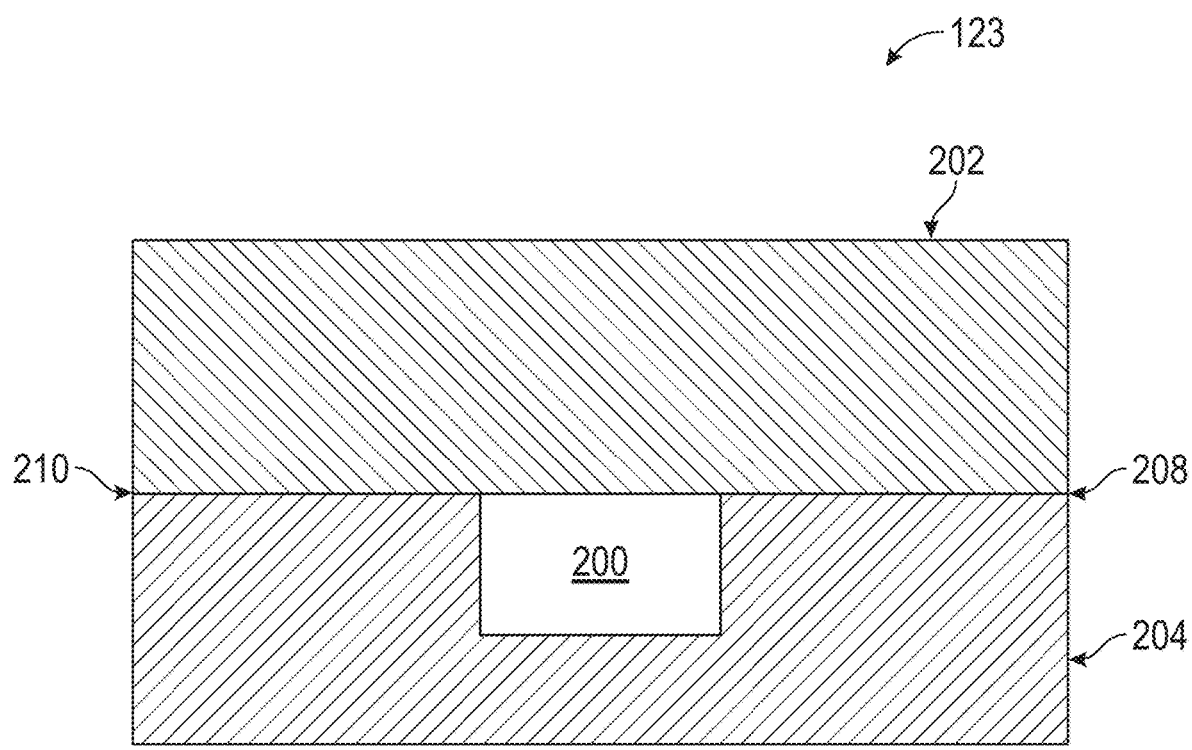
FIG. 2 illustrates an side view of a tangible token according to certain embodiments of this disclosure.

FIG. 2 illustrates a side view of a tangible token 123 according to certain embodiments of this disclosure. As depicted, a first transparent gemstone 204 includes a first internal side 210, and a second transparent gemstone 202 includes a second internal side 208. The first internal side 210 includes an etching 200 that is recessed due to a laser etching machine, for example. The etching 200 may be filled with a material, in some embodiments. The material may include a mineral material, such as a metal and/or liquid (e.g., paint). In some embodiments, the etching 200 may represent the information associated with the blockchain 116, such as the private key, public key, and/or address. The etching 200 may be sized smaller than can be viewed by the naked eye (e.g., less than 0.1 millimeter), in some embodiments. Alternatively, the etching 200 may be bigger than visible to the naked eye (e.g., more than 0.1 millimeter). Each of the first transparent gemstone 204 and the second transparent gemstone 202 may be sapphire, diamond, or the like. As depicted, the etching 200 representing the information is encapsulated within a perimeter of the tangible token 123 such that the information does not extend beyond the perimeter. In this way, a hermetic seal is created after the first and second transparent gemstones are molecularly fused together.

In some embodiments, the tangible token 123 may be grown in a lab from sapphire or diamond such that there is no fusion of two transparent gemstones. In some embodiments, the information is etched during a growing process (e.g., in the middle of the growing process) of a single transparent gemstone and the information is etched on a surface of the partially grown single transparent gemstone. Once the information is etched on the gemstone surface, the growing process may continue such that the information is included internally within a fully grown single transparent gemstone. The gemstone may include obtaining a small slice of a gemstone and placing the gemstone in a crucible container. A chamber of the crucible container may be filled with ingredients (e.g., a blended liquid of minerals) that feeds the gemstone growth, and the growth may be accomplished at a certain temperature (e.g., 1,000 degrees Celsius) or within a range of temperatures (e.g., 1,000 degrees Celsius to 1,500 degrees Celsius). The gemstone may be grown naturally by recreating conditions in which gems grow in the earth. The chamber may be sealed with and pressure may be added to the chamber. A combination of ingredients, heat, and pressure may be applied for a certain period of time to enable the gem to crystallize and grow. To grow a diamond in a lab, carbon may be exposed to high pressure and temperature in a controlled environment for a certain amount of time (e.g., 10-12 months).

During the growing process, the conditions (e.g., pressure and temperature) may be modified to enable the growing gemstone to be accessed within the chamber and laser-etched with the information pertaining to the NFT and/or cryptocurrency. The partially grown gemstone may be placed under the growing conditions again so growth of the gemstone may begin again and the information internally included within the outer edge/surface of the fully grown gemstone.

Figure 3:
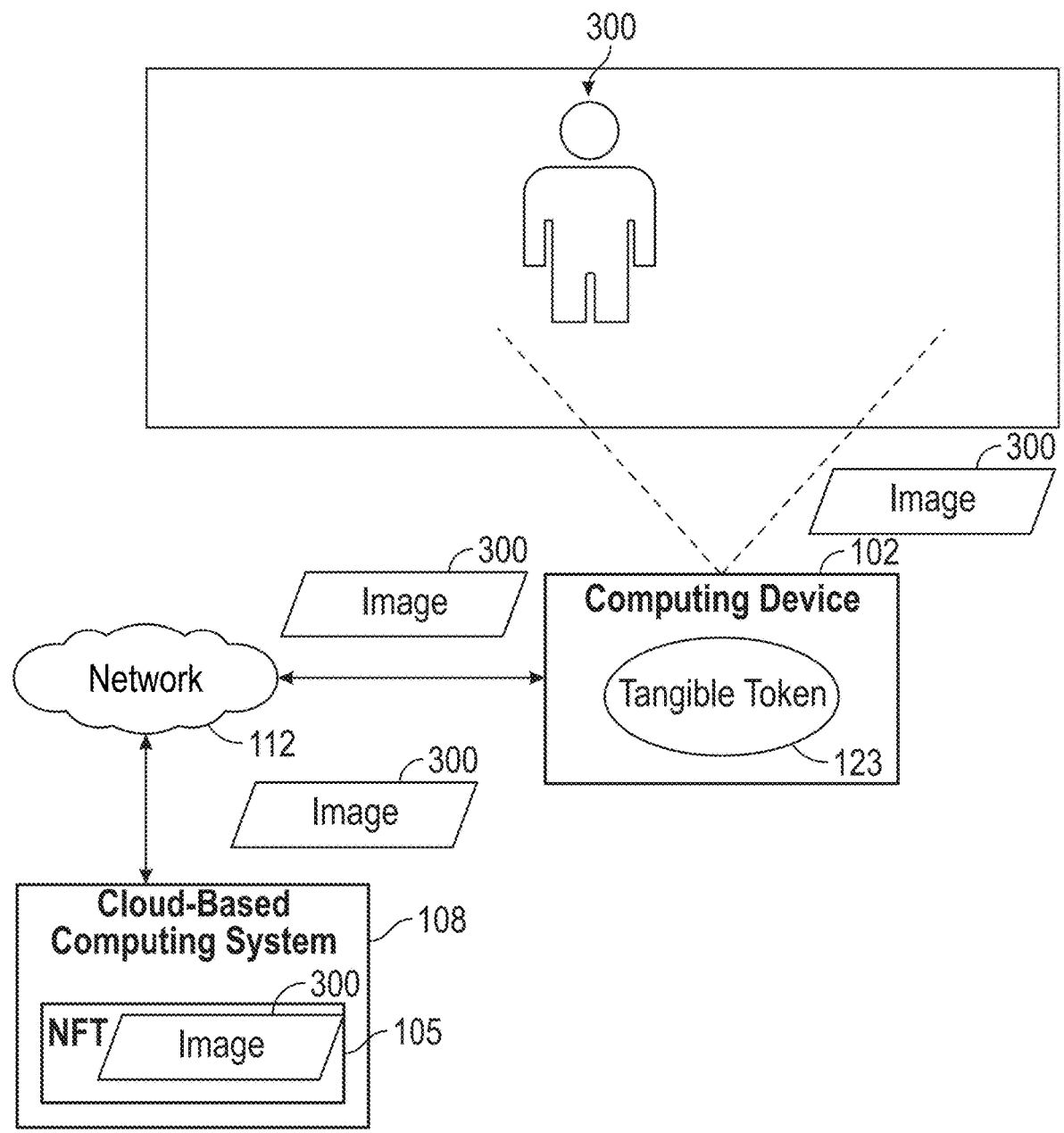
FIG. 3 illustrates a computing device projecting an image retrieved from a non-fungible token based on information read from a tangible token according to certain embodiments of this disclosure.

FIG. 3 illustrates a computing device projecting an image 300 retrieved from a non-fungible token 105 based on information read from a tangible token 123 according to certain embodiments of this disclosure. The computing device 102 may use its reading component 104 to read the information internally included within the tangible token 123. The information may include an address of the blockchain 116, a public key associated with the blockchain 116, and/or a private key associated with the blockchain 116. The computing device 102 may connect to the cloud-based computing system 108 via the network 112 and transmit the information to the cloud-based computing system 108. The cloud-based computing system 108 may receive the information and validate the owner of the NFT 105 is associated with the private key at the address specified in the information. Once the NFT 105 is validated for the owner's private key, the cloud-based computing system 108 may retrieve an image 300 from the block associated with the NFT 105. The image 300 may be transmitted, via the network 112, to the computing device 102. The computing device 102 may use a projector to project the image 300 on a surface, as depicted (e.g., a person is projected on the surface). In some instances, the image 300 may represent a jewelry design of a unique piece of jewelry. In some embodiments, the computing device 102 may present the image 300 on the user interface 106.

Figure 4:
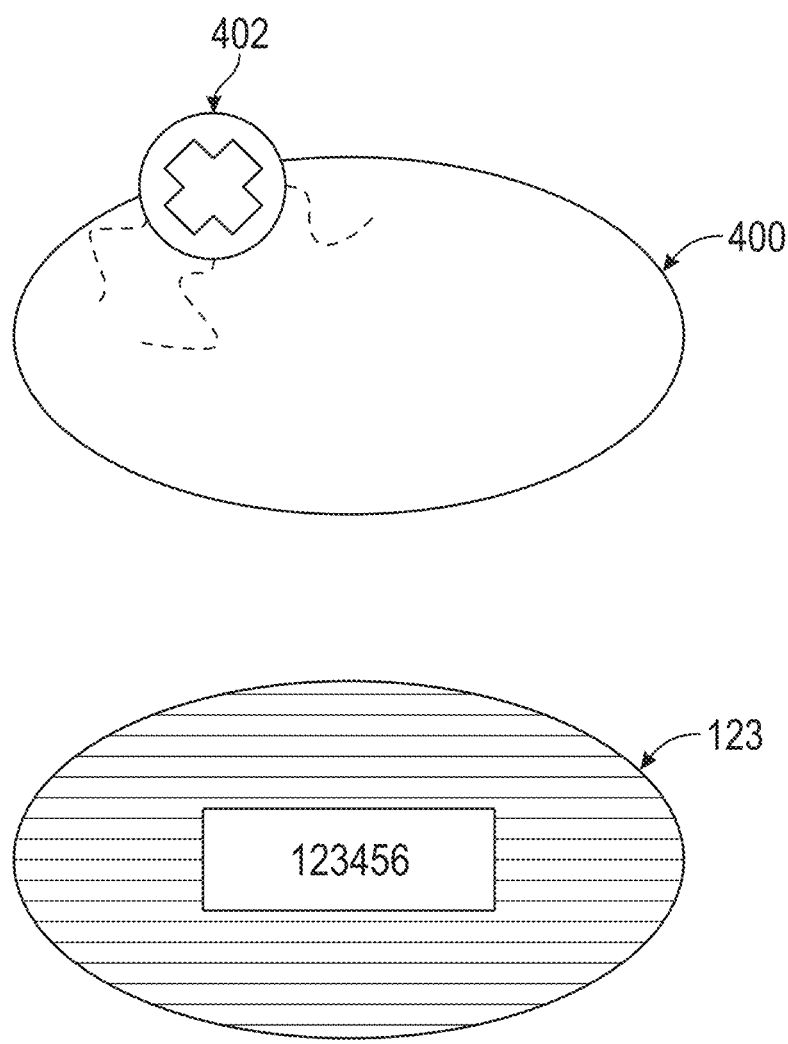
FIG. 4 illustrates a sealed tangible token including information associated with a blockchain according to certain embodiments of this disclosure.

FIG. 4 illustrates a sealed tangible token 400 including information associated with a blockchain according to certain embodiments of this disclosure. As depicted, the sealed tangible token 400 may be covered in an opaque material such that information etched internally within the tangible token 123 is not visible. The opaque material may include wax, paint, rubber, plastic, etc. To remove the opaque material, it may be cracked (e.g., represented by the X 402) and/or peeled off from the underlying tangible token 123. As depicted, once the opaque material is removed, the tangible token 123 is viewable and its transparent property enables the private key ("123456") to be read, either by the naked eye or with a magnifying object or the computing device 102.

Figure 5:
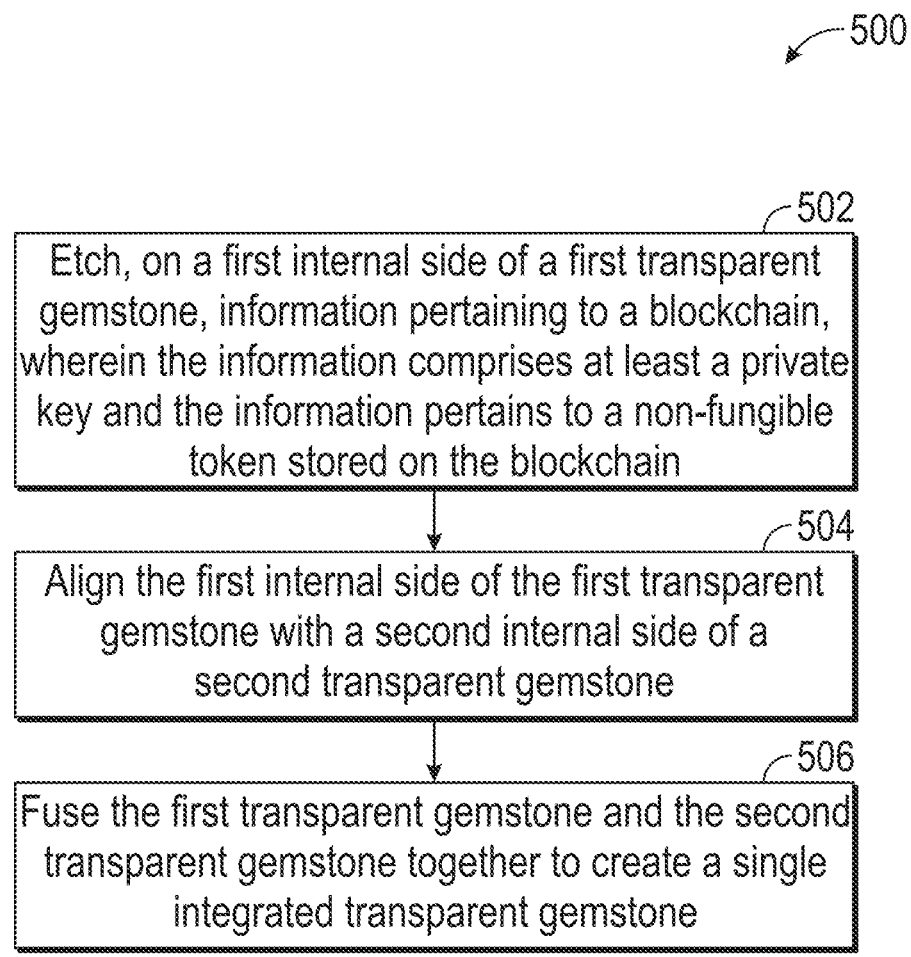
FIG. 5 illustrates an example of a method for manufacturing a single integrated transparent gemstone internally etched with information pertaining to a non-fungible token according to certain embodiments of this disclosure.

FIG. 5 illustrates an example of a method 500 for manufacturing a single integrated transparent gemstone internally etched with information pertaining to a non-fungible token according to certain embodiments of this disclosure. At block 502, a laser etching machine may etch, on a first internal side of a first transparent gemstone, information pertaining to a blockchain. The laser etching and/or engraving machine may include a laser, a controller, and a surface. The laser may emit a high quality monochromatic beam that allows the controller to trace patterns onto the surface. The laser may etch out and/or engrave out material of the substrate being targeted (e.g., the sapphire). In some embodiments, a material is added to the recession created by the etching such that the material fills the recession. The material may be detected and/or read by a reading component of a computing device performing optical character recognition, computer vision, or the like.

The information may include at least a private key associated with a blockchain, a public key associated with a blockchain, and/or an address associated with the blockchain. In some embodiments, the information may be associated with a non-fungible token stored on the blockchain. The information may include an image of a digital jewelry design, artwork, a logo, any suitable image, graphic design, text content, a symbol, a character, or some combination thereof. The information may be machine-readable and/or human-readable. In some embodiments, the information is etched to a size that is not visible to the naked eye (e.g., less than 0.1 millimeter) on the internal side of the first transparent gemstone. In some embodiments, the information is etched to a size that is readable by the naked eye of a human (e.g., greater than 0.1 millimeter). In some embodiments, the gemstone is a sapphire, diamond, etc.

At block 504, the first internal side of the first transparent gemstone may be aligned with a second internal side of a second transparent gemstone. The first and second transparent gemstones may be wafers. The aligning may encapsulate the information within a perimeter of the first and second internal sides such that the information does not extend beyond the perimeter.

At block 506, the first and second transparent gemstones may be fused together to create a single integrated transparent gemstone including the internally etched information. The fusing may provide a hermetic seal that prevents the information from being exposed to gas, pressure, etc. In some embodiments, the single integrated transparent gemstone may be attached to a piece of jewelry (e.g., a necklace, a bracelet, an anklet, a ring, an earring, etc.).

In some embodiments, the method 500 may include sealing the single integrated transparent gemstone in an opaque material such that the information is not visible. The opaque material may include clay, wax, rubber, plastic, paper, etc. To view the information included internally within the single integrated transparent gemstone, the opaque material may be removed, peeled, cracked, broken, etc. Once the opaque material is removed, the single integrated transparent gemstone may be examined to identify and determine the information internally etched within the single integrated transparent gemstone.

Figure 6:
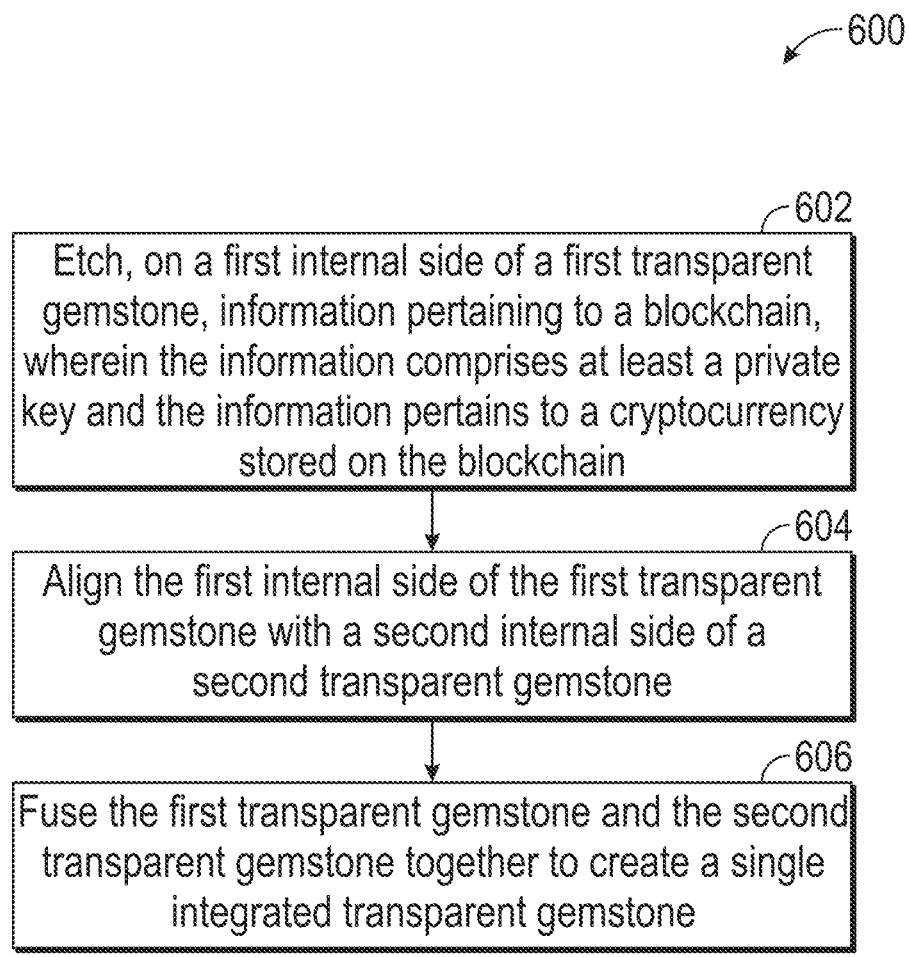
FIG. 6 illustrates an example of a method for manufacturing a single integrated transparent gemstone internally etched with information pertaining to a cryptocurrency according to certain embodiments of this disclosure.

FIG. 6 illustrates an example of a method 600 for manufacturing a single integrated transparent gemstone internally etched with information pertaining to a cryptocurrency according to certain embodiments of this disclosure. At block 602, a laser etching machine may etch, on a first internal side of a first transparent gemstone, information pertaining to a blockchain. The laser etching and/or engraving machine may include a laser, a controller, and a surface. The laser may emit a high quality monochromatic beam that allows the controller to trace patterns onto the surface. The laser may etch out and/or engrave out material of the substrate being targeted (e.g., the sapphire). In some embodiments, a material is added to the recession created by the etching such that the material fills the recession. The material may be detected and/or read by a reading component of a computing device performing optical character recognition, computer vision, or the like.

The information may include at least a private key associated with a blockchain, a public key associated with a blockchain, and/or an address associated with the blockchain. In some embodiments, the information may be associated with a cryptocurrency stored on the blockchain and/or stored in a digital wallet associated with the owner of the cryptocurrency. The information may be machine-readable and/or human-readable. In some embodiments, the information is etched to a size that is not visible to the naked eye (e.g., less than 0.1 millimeter) on the internal side of the first transparent gemstone. In some embodiments, the information is etched to a size that is readable by the naked eye of a human (e.g., greater than 0.1 millimeter). In some embodiments, the gemstone is a sapphire, diamond, etc.

At block 604, the first internal side of the first transparent gemstone may be aligned with a second internal side of a second transparent gemstone. The first and second transparent gemstones may be wafers. The aligning may encapsulate the information within a perimeter of the first and second internal sides such that the information does not extend beyond the perimeter.

At block 606, the first and second transparent gemstones may be fused together to create a single integrated transparent gemstone including the internally etched information. The fusing may provide a hermetic seal that prevents the information from being exposed to gas, pressure, etc.

Figure 7:
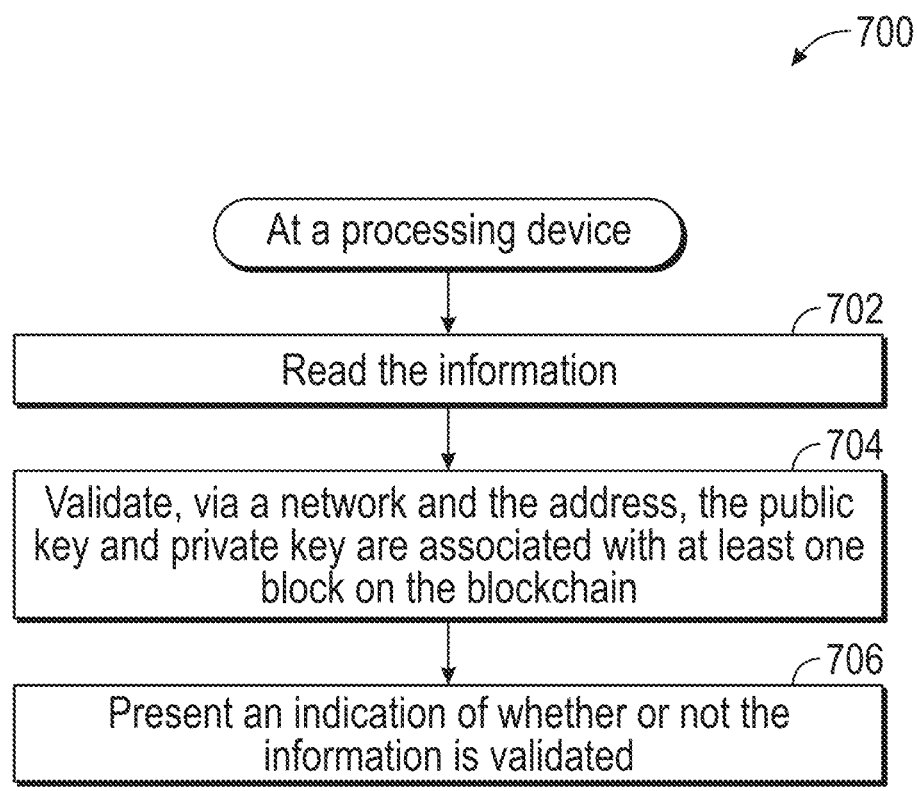
FIG. 7 illustrates an example of a method for validating information etched on a tangible token according to certain embodiments of this disclosure.

FIG. 7 illustrates an example of a method 700 for validating information etched on a tangible token according to certain embodiments of this disclosure. The method 700 may be performed by processing logic that may include hardware (circuitry, dedicated logic, etc.), software, or a combination of both. The method 700 and/or each of their individual functions, subroutines, or operations may be performed by one or more processors of a computing device (e.g., any component of cloud-based computing system 108 and/or computing device 102 of FIG. 1) implementing the method 700. The method 700 may be implemented as computer instructions stored on a memory device and executable by the one or more processors. In certain implementations, the method 700 may be performed by a single processing thread. Alternatively, the method 700 may be performed by two or more processing threads, each thread implementing one or more individual functions, routines, subroutines, or operations of the methods.

At block 702, the processing device may read the information etched internally within the single integrated transparent gemstone. The information may be machine-readable (e.g., a barcode, a quick response code, binary, alphanumeric characters, etc.). In some embodiments, the single integrated transparent gemstone may be sapphire, diamond, or another gemstone. In some embodiments, the single integrated transparent gemstone may be a one-inch disk, a two-inch disk, a three-inch disk, or a four-inch disk.

The single integrated transparent gemstone may be inserted into a computing device that uses a reading component (e.g., sensor, camera, etc.) to read the information and the information may be processed using optical character recognition or other suitable techniques via a processing device of the computing device. The information may include a private key associated with a block on a blockchain, a public key associated with the block on the blockchain, and/or an address of the block on the blockchain. In some embodiments, the information may include text and/or an image that is etched internally within the single integrated transparent gemstone.

At block 704, the processing device may validate, via a network and the address, the public key and/or the private key are associated with at least the block on the blockchain. If the key(s) are validated, at block 706, the processing device may present an indication that the information is validated on a user interface of a computing device. If the key(s) are not validated, the processing device may present an indication that the information is not validated and prevent any further interaction with the block on the blockchain.

Figure 8:
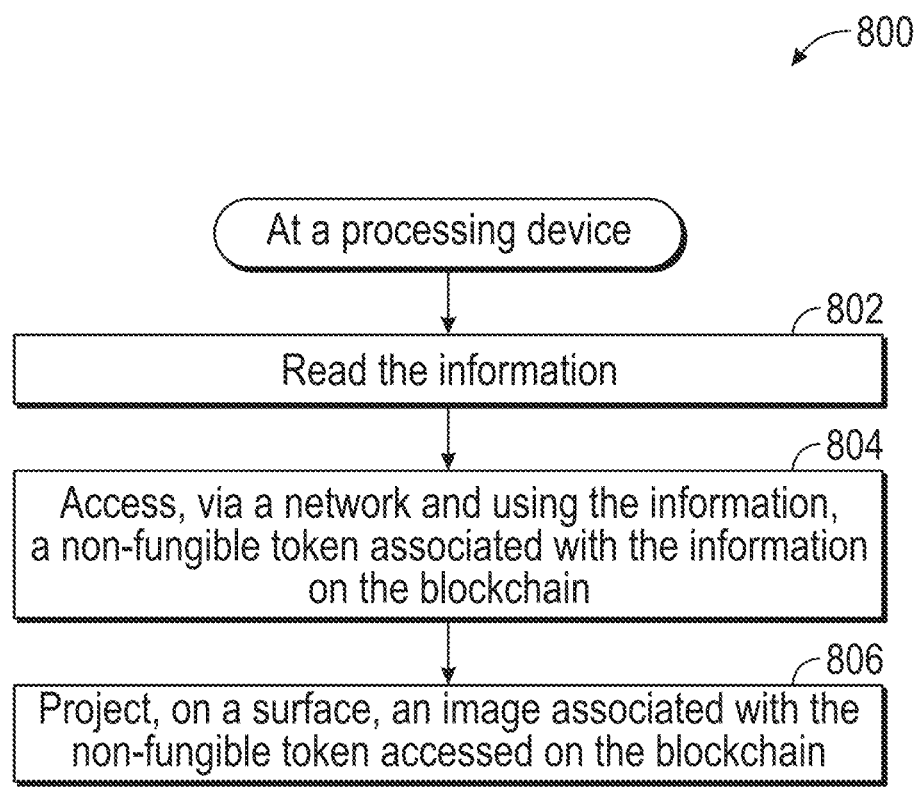
FIG. 8 illustrates an example of a method for projecting information obtained from a non-fungible token associated with a tangible token according to certain embodiments of this disclosure.

FIG. 8 illustrates an example of a method 800 for projecting information obtained from a non-fungible token associated with a tangible token according to certain embodiments of this disclosure. The method 800 may be performed by processing logic that may include hardware (circuitry, dedicated logic, etc.), software, or a combination of both. The method 800 and/or each of their individual functions, subroutines, or operations may be performed by one or more processors of a computing device (e.g., any component of cloud-based computing system 108 and/or computing device 102 of FIG. 1) implementing the method 800. The method 800 may be implemented as computer instructions stored on a memory device and executable by the one or more processors. In certain implementations, the method 800 may be performed by a single processing thread. Alternatively, the method 800 may be performed by two or more processing threads, each thread implementing one or more individual functions, routines, subroutines, or operations of the methods.

At block 802, the processing device may read the information etched internally within the single integrated transparent gemstone. The information may include a private key associated with a block on a blockchain, a public key associated with the block on the blockchain, and/or an address of the block on the blockchain. In some embodiments, the information may include text and/or an image that is etched internally within the single integrated transparent gemstone.

At block 804, the processing device may access, via a network and using the information, a non-fungible token associated with the information on the blockchain. Any data included in transactions associated with the non-fungible token may be downloaded to the computing device including the processing device. For example, one or more images, text, audio, video, etc. may be downloaded to the computing device. In one embodiment, the data may include a digital model of a jewelry design that is downloaded and projected on a surface (e.g., wall, floor, screen, etc.). In some embodiments, the image may include a patent design, artwork, a drawing, text, any suitable image, etc. that may be downloaded and projected onto a surface and/or displayed in a user interface of the computing device 102.

Figure 9:
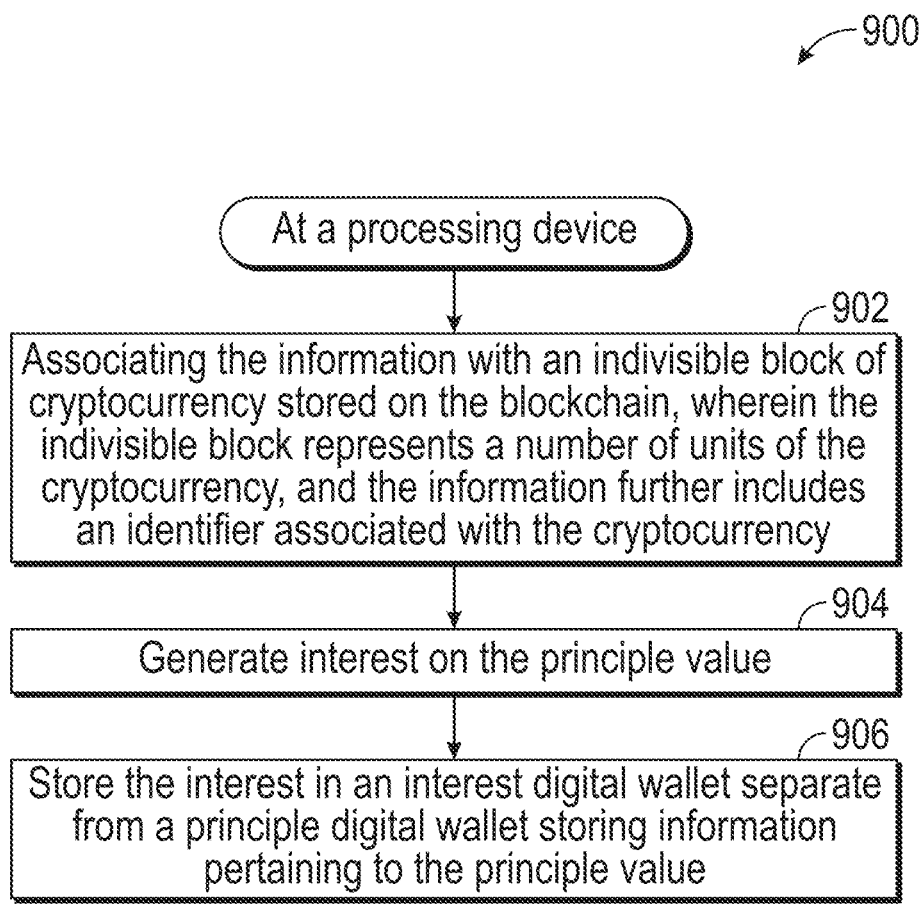
FIG. 9 illustrates an example of a method for generating interest on a principle value associated with an indivisible block of cryptocurrency stored on a blockchain according to certain embodiments of this disclosure.

FIG. 9 illustrates an example of a method 900 for generating interest on a principle value associated with an indivisible block of cryptocurrency stored on a blockchain according to certain embodiments of this disclosure. The method 900 may be performed by processing logic that may include hardware (circuitry, dedicated logic, etc.), software, or a combination of both. The method 900 and/or each of their individual functions, subroutines, or operations may be performed by one or more processors of a computing device (e.g., any component of cloud-based computing system 108 and/or computing device 102 of FIG. 1) implementing the method 900. The method 900 may be implemented as computer instructions stored on a memory device and executable by the one or more processors. In certain implementations, the method 900 may be performed by a single processing thread. Alternatively, the method 900 may be performed by two or more processing threads, each thread implementing one or more individual functions, routines, subroutines, or operations of the methods.

At block 902, the processing device may associate the information with an indivisible block of cryptocurrency stored on the blockchain. The indivisible block may represent a number of units of the cryptocurrency. Information may be etched and/or engraved internally within the tangible token. The information may include an identifier associated with the cryptocurrency. For example, for Bitcoin, the identifier may be the Bitcoin logo that is etched and/or engraved internally within the tangible token, as well other information including a private key and/or a public key to an NFT and/or cryptocurrency and/or an address of a block on a blockchain stored on several computing devices.

At block 904, the processing device may generate interest (e.g., a monetary amount determined based on a percentage of the principle value) on the principle value of a number of units of the cryptocurrency represented by the indivisible block on the blockchain. The interest may be stored, at block 906, in an interest digital wallet separate from a principle digital wallet storing information pertaining to the principle value. In some embodiments, the indivisible block of cryptocurrency on the block may be registered to a first owner, and the processing device may transfer ownership of the indivisible block of cryptocurrency on the blockchain to a second owner. To perform the transfer, the private key may be used and validated to ensure the first owner owns the indivisible block on the blockchain. Once verified, a transaction may be added to the indivisible block that indicates ownership has passed from the first owner to the second owner and the transaction may be stored in the ledger of the block and may include a timestamp of the transaction.

Figure 10:
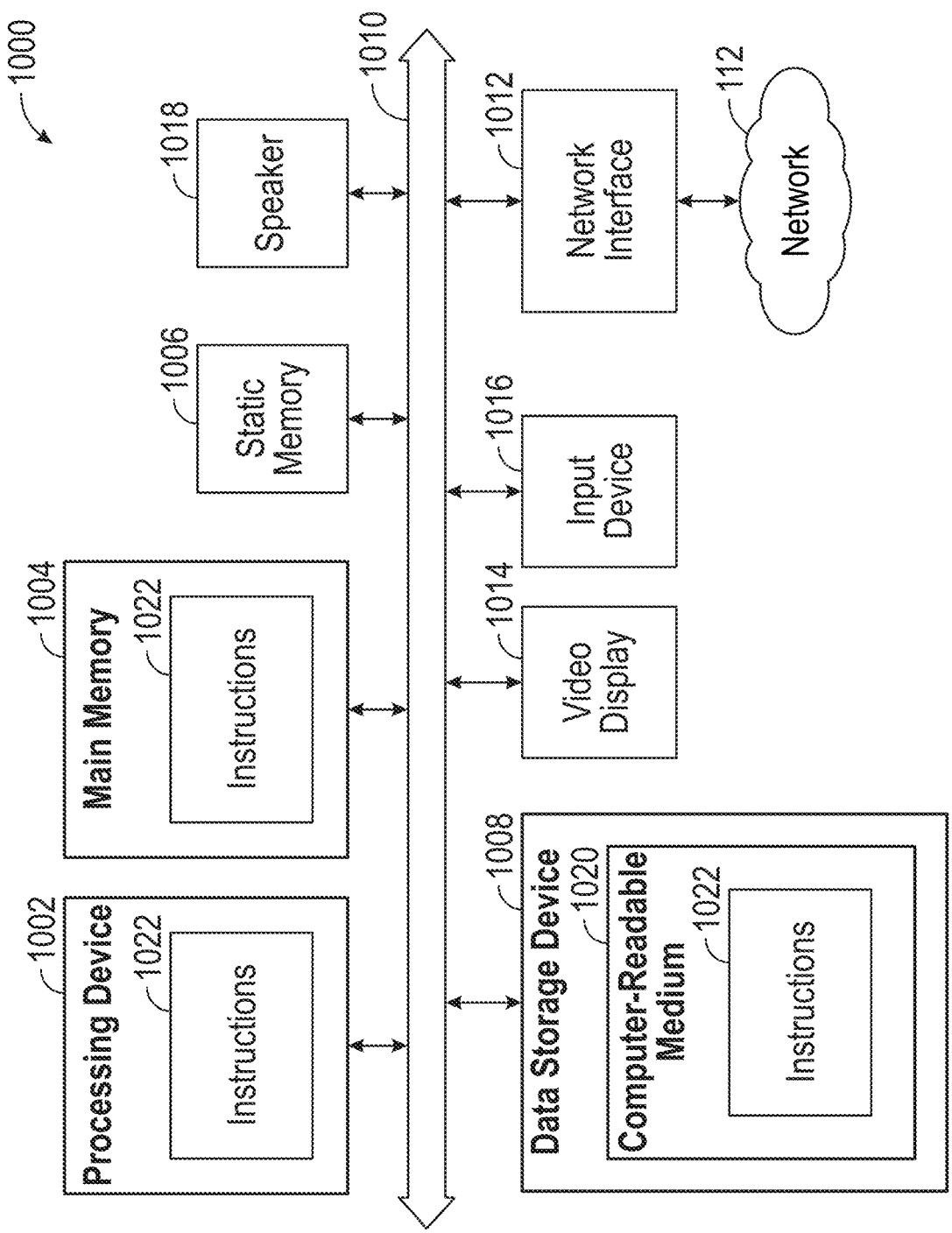
FIG. 10 illustrates an example computer system according to embodiments of this disclosure.

FIG. 10 illustrates an example of a computer system 1000, which can perform any one or more of the methods described herein. In one example, computer system 1000 may include one or more components that correspond to the computing device 102 and/or one or more servers of the cloud-based computing system 108 of FIG. 1. The computer system 1000 may be connected (e.g., networked) to other computer systems in a LAN, an intranet, an extranet, or the Internet. The computer system 1000 may operate in the capacity of a server in a client-server network environment. The computer system 1000 may be a personal computer (PC), a tablet computer, a laptop, a wearable (e.g., wristband), a set-top box (STB), a personal Digital Assistant (PDA), a smartphone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The computer system 1000 includes a processing device 1002, a main memory 1004 (e.g., read-only memory (ROM), solid state drive (SSD), flash memory, dynamic random access memory (DRAM) such as synchronous DRAM (SDRAM)), a static memory 1006 (e.g., solid state drive (SSD), flash memory, static random access memory (SRAM)), and a data storage device 1008, which communicate with each other via a bus 1010.

Processing device 1002 represents one or more general-purpose processing devices such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1002 may also be one or more special-purpose processing devices such as an application specific integrated circuit (ASIC), a field programmable gate array (FPGA), a digital signal processor (DSP), network processor, or the like. The processing device 1002 is configured to execute instructions for performing any of the operations and steps of any of the methods discussed herein.

The computer system 1000 may further include a network interface device 1012. The computer system 1000 also may include a video display 1014 (e.g., a liquid crystal display (LCD) or a cathode ray tube (CRT)), one or more input devices 1016 (e.g., a keyboard and/or a mouse), and one or more speakers 1018 (e.g., a speaker). In one illustrative example, the video display 1014 and the input device(s) 1016 may be combined into a single component or device (e.g., an LCD touch screen).

The data storage device 1008 may include a computer-readable medium 1020 on which the instructions 1022 embodying any one or more of the methodologies or functions described herein are stored. The instructions 1022 may also reside, completely or at least partially, within the main memory 1004 and/or within the processing device 1002 during execution thereof by the computer system 1000. As such, the main memory 1004 and the processing device 1002 also constitute computer-readable media. The instructions 1022 may further be transmitted or received over a network 20 via the network interface device 1012.

While the computer-readable medium 1020 is shown in the illustrative examples to be a single medium, the term "computer-readable medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Figure 11:
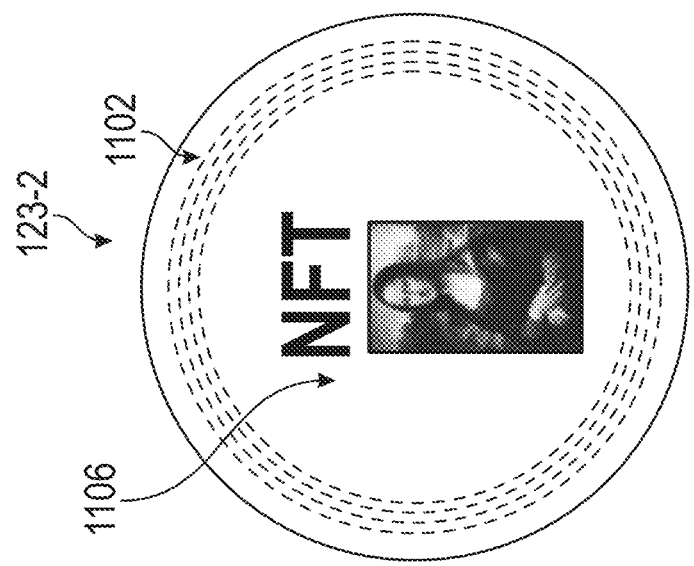
FIG. 11 illustrates an example cryptocurrency tangible token and an example NFT tangible token according to embodiments of this disclosure.
Figure 11:
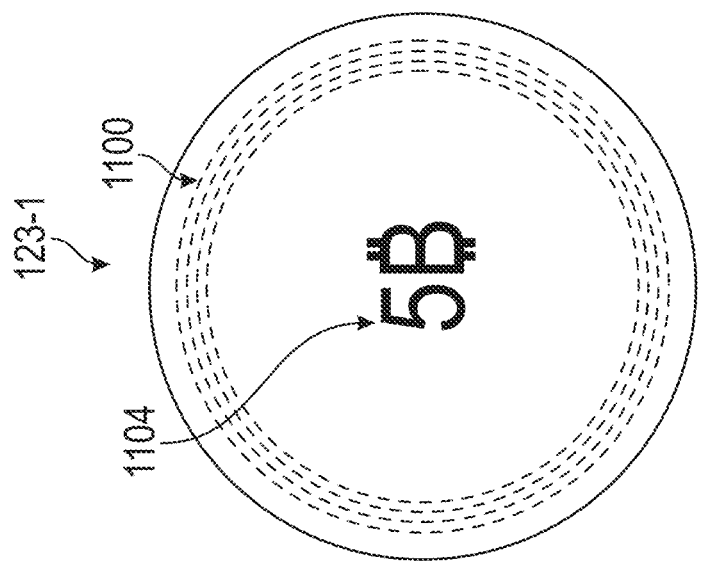

FIG. 11 illustrates an example cryptocurrency tangible token 123-1 and an example NFT tangible token 123-2 according to embodiments of this disclosure. The cryptocurrency tangible token 123-1 includes associated with the cryptocurrency represented by the tangible token 123-1. For example, graphic 1104 includes "5 B" which stands for 5 BITCOIN that is represented by the tangible token 123-1. The graphic 1104 indicates that the cryptocurrency tangible token 123-1 represent a block of 5 BITCOIN stored on the blockchain at particular address of the blockchain. Also, etched or engraved or lasered on the cryptocurrency tangible token 123-1 is a line 1100 that is not visible to the naked eye, in some embodiments. The line 1100 represents a private key associated with the cryptocurrency on the blockchain, a public key associated with the cryptocurrency on the blockchain, an address associated with the cryptocurrency on the blockchain, any other suitable information. The information represented by the line 1100 may be read with a magnifying glass, microscope, or similar enlarging device, and thus, is human-readable in some embodiments. Further, the information represented by the line 1100 may be read by the reading component 104 of the computing device 102, and thus, is machine-readable in some embodiments. The line 1100 may be visible through the transparent gemstone that forms the tangible token 123-1. The information may be digitized again by using a digital scanner with a high precision (e.g., above 20,000 dots per inch).

The NFT tangible token 123-2 includes associated with the cryptocurrency represented by the tangible token 123-2. For example, graphic 1106 includes "NFT" which may be a title associated with the NFT or a brand of the NFT. Further, the graphic 1106 includes a portrait of cars and a user. Any suitable image may be etched onto the NFT tangible token 123-2. In some embodiments, multiple images may be etched onto the tangible token 123-2. In some embodiments, the graphic 1106 is stored on the blockchain with the NFT at a particular address of the blockchain. Also, etched or engraved or lasered on the cryptocurrency tangible token 123-2 is a line 1102 that is not visible to the naked eye, in some embodiments. The line 1102 represents a private key associated with the NFT on the blockchain, a public key associated with the NFT on the blockchain, an address associated with the NFT on the blockchain, any other suitable information. The information represented by the line 1102 may be read with a magnifying glass, microscope, or the like, and thus, is human-readable in some embodiments. Further, the information represented by the line 1102 may be read by the reading component 104 of the computing device 102, and thus, is machine-readable in some embodiments. The line 1102 may be visible through the transparent gemstone that forms the tangible token 123-1.

The various aspects, embodiments, implementations or features of the described embodiments can be used separately or in any combination. The embodiments disclosed herein are modular in nature and can be used in conjunction with or coupled to other embodiments, including both statically-based and dynamically-based equipment. In addition, the embodiments disclosed herein can employ selected equipment such that they can identify individual users and auto-calibrate threshold multiple-of-body-weight targets, as well as other individualized parameters, for individual users.

The foregoing description, for purposes of explanation, used specific nomenclature to provide a thorough understanding of the described embodiments. However, it should be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It should be apparent to one of ordinary skill in the art that many modifications and variations are possible in view of the above teachings.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

Clauses:

Clause 1. A method comprising:
  etching, on a first internal side of a first transparent gemstone, information pertaining to a blockchain, wherein the information comprises at least a private key;
  aligning the first internal side of the first transparent gemstone with a second internal side of a second transparent gemstone, wherein the aligning encapsulates the information within a perimeter of the second internal side such that the information does not extend beyond the perimeter; and
  fusing the first transparent gemstone and the second transparent gemstone together to create a single integrated transparent gemstone.

Clause 2. The method of any clause herein, wherein the information comprises a public key and an address of the blockchain.

Clause 3. The method of any clause herein, wherein the information is machine-readable and the method includes inserting the single integrated transparent gemstone into a computing device configured to execute instructions that cause the computing device to:
  read the information,
  validate, via a network and the address, the public key and private key are associated with at least one block on the blockchain, and
  present an indication of whether or not the information is validated.

Clause 4. The method of any clause herein, wherein the computing device is configured to use optical character recognition to read the information.

Clause 5. The method of any clause herein, wherein the single integrated transparent gemstone comprises sapphire.

Clause 6. The method of any clause herein, wherein the single integrated transparent gemstone comprises a one-inch disk, a two-inch disk, a three-inch disk, or a four-inch disk.

Clause 7. The method of any clause herein, wherein the information pertains to a non-fungible token stored on the blockchain.

Clause 8. The method of any clause herein, wherein the information pertains to a cryptocurrency stored on the blockchain.

Clause 9. The method of any clause herein, wherein the information further comprises a graphic design, text content, an image, a logo, a symbol, a character, or some combination thereof.

Clause 10. The method of any clause herein, further comprising attaching the single integrated transparent gemstone to a piece of jewelry.

Clause 11. The method of any clause herein, wherein the information is machine-readable and the method includes inserting the single integrated transparent gemstone into a computing device configured to execute instructions that cause the computing device to:
  read the information,
  access, via a network and using the information, a non-fungible token associated with the information on the blockchain, and
  project, on a surface, an image associated with the non-fungible token accessed on the blockchain.

Clause 12. The method of any clause herein, further comprising sealing the single integrated transparent gemstone in an opaque material such that the information is not visible.

Clause 13. The method of any clause herein, wherein the information is associated with an indivisible block of cryptocurrency stored on the blockchain, wherein the indivisible block represents a number of units of the cryptocurrency, and the information further comprises an identifier associated with the cryptocurrency.

Clause 14. The method of any clause herein, wherein the number of units are associated with a principle value, and the method further comprises:
  using a processing device to generate interest on the principle value; and
  storing the interest in an interest digital wallet separate from a principle digital wallet storing information pertaining to the principle value.

Clause 15. The method of any clause herein, wherein the indivisible block of cryptocurrency on the blockchain is registered to a first owner, and the method further comprises using a processing device to transfer ownership of the indivisible block of cryptocurrency on the blockchain to a second owner.

Clause 16. The method of any clause herein, wherein the private key has a size of greater than 0.1 millimeter.

Clause 17. The method of any clause herein, wherein the private key has a size of less than 0.1 millimeter.

Clause 18. The method of any clause herein, wherein the information further comprises a barcode, a quick response code, or both.

Clause 19. A system comprising:
  a tangible token comprising a single integrated transparent gemstone, wherein:
    the single integrated transparent gemstone is produced by fusing together a first transparent gemstone and a second transparent gemstone,
    a first internal side of the first transparent gemstone is etched with information pertaining to a blockchain, and the information comprises at least a private key, a public key, and an address;
    the first internal side of the first transparent gemstone is aligned with a second internal side of the second transparent gemstone, and
    the aligning encapsulates the information within a perimeter of the second internal side such that the information does not extend beyond the perimeter; and
  a computing device configured to execute instructions that cause the computing device to:
    read the information,
    validate, via a network and the address, the public key and private key are associated with at least one block on the blockchain, and
    present an indication of whether or not the information is validated.

Clause 20. The system of any clause herein, wherein the computing device is configured to use optical character recognition to read the information.

Clause 21. The system of any clause herein, wherein the single integrated transparent gemstone comprises sapphire.

Clause 22. The system of any clause herein, wherein the single integrated transparent gemstone comprises a one-inch disk, a two-inch disk, a three-inch disk, or a four-inch disk.

Clause 23. The system of any clause herein, wherein the information pertains to a non-fungible token stored on the blockchain.

Clause 24. The system of any clause herein, wherein the information pertains to a cryptocurrency stored on the blockchain.

Clause 25. The system of any clause herein, wherein the information further comprises a graphic design, text content, an image, a logo, a symbol, a character, or some combination thereof.

Clause 26. The system of any clause herein, further comprising attaching the single integrated transparent gemstone to a piece of jewelry.

Clause 27. The system of any clause herein, the computing device is configured to execute the instructions to:
 read the information,
 access, via the network and using the information, a non-fungible token associated with the information on the blockchain, and
 project, on a surface, an image associated with the non-fungible token accessed on the blockchain.

Clause 28. The system of any clause herein, further comprising sealing the single integrated transparent gemstone in an opaque material such that the information is not visible.

Clause 29. The system of any clause herein, wherein the information is associated with an indivisible block of cryptocurrency stored on the blockchain, wherein the indivisible block represents a number of units of the cryptocurrency, and the information further comprises an identifier associated with the cryptocurrency.

Clause 30. The system of any clause herein, wherein the number of units are associated with a principle value, and the method further comprises:
 using a processing device to generate interest on the principle value; and
 storing the interest in an interest digital wallet separate from a principle digital wallet storing information pertaining to the principle value.

Clause 31. The system of any clause herein, wherein the indivisible block of cryptocurrency on the blockchain is registered to a first owner, and the method further comprises using a processing device to transfer ownership of the indivisible block of cryptocurrency on the blockchain to a second owner.

Clause 32. The system of any clause herein, wherein the private key has a size of greater than 0.1 millimeter.

Clause 33. The system of any clause herein, wherein the private key has a size of less than 0.1 millimeter.

Clause 34. The system of any clause herein, wherein the information further comprises a barcode, a quick response code, or both.

Clause 35. A computing device comprising:
 a memory device storing instructions;
 a reading component configured to obtain an image of a tangible token, wherein the tangible token comprises a single integrated transparent gemstone including information etched internally within the single integrated transparent gemstone; and
 a processing device communicatively coupled to the memory device and the reading component, wherein the processing device is configured to execute the instructions to:
  receive the image of the tangible token from the reading component;
  analyze the image to obtain the information associated with the tangible token, wherein the information comprises a public key associated with a block on a blockchain, a private key associated with the block on the blockchain, and an address of the block on the blockchain;
  validate, via a network and the address, the public key and private key are associated with the block on the blockchain;
  present an indication of whether or not the information is validated; and
  project at least a portion of the information on a surface.

Clause 36. The computing device of any clause herein, wherein the computing device is configured to use optical character recognition to read the information.

Clause 37. The computing device of any clause herein, wherein the single integrated transparent gemstone comprises sapphire.

Clause 38. The computing device of any clause herein, wherein the single integrated transparent gemstone comprises a one-inch disk, a two-inch disk, a three-inch disk, or a four-inch disk.

Clause 39. The computing device of any clause herein, wherein the information pertains to a non-fungible token stored on the blockchain.

Clause 40. The computing device of any clause herein, wherein the information pertains to a cryptocurrency stored on the blockchain.

Clause 41. The computing device of any clause herein, wherein the information further comprises a graphic design, text content, an image, a logo, a symbol, a character, or some combination thereof.

Clause 42. The computing device of any clause herein, further comprising attaching the single integrated transparent gemstone to a piece of jewelry.

Clause 43. The computing device of any clause herein, wherein the processing device is configured to:
 read the information,
 access, via the network and using the information, a non-fungible token associated with the information on the blockchain, and
 project, on a surface, an image associated with the non-fungible token accessed on the blockchain.

Clause 44. The computing device of any clause herein, further comprising sealing the single integrated transparent gemstone in an opaque material such that the information is not visible.

Clause 45. The computing device of any clause herein, wherein the information is associated with an indivisible block of cryptocurrency stored on the blockchain, wherein the indivisible block represents a number of units of the cryptocurrency, and the information further comprises an identifier associated with the cryptocurrency.

Clause 46. The computing device of any clause herein, wherein the number of units are associated with a principle value, and the method further comprises:
 using a processing device to generate interest on the principle value; and
 storing the interest in an interest digital wallet separate from a principle digital wallet storing information pertaining to the principle value.

Clause 47. The computing device of any clause herein, wherein the indivisible block of cryptocurrency on the blockchain is registered to a first owner, and the method further comprises using a processing device to transfer ownership of the indivisible block of cryptocurrency on the blockchain to a second owner.

Clause 48. The computing device of any clause herein, wherein the private key has a size of greater than 0.1 millimeter.

Clause 49. The computing device of any clause herein, wherein the private key has a size of less than 0.1 millimeter.

Clause 50. The computing device of any clause herein, wherein the information further comprises a barcode, a quick response code, or both.

Clause 51. The method of any clause herein wherein the information is at least partially obscured by attaching a bezel to the single integrated transparent gemstone.

Clause 52. The system of any cause herein, a tangible token comprising a single transparent gemstone, wherein:
the single transparent gemstone is produced by etching information pertaining to a blockchain on a gemstone surface during a growing process of the gemstone, and the single transparent gemstone is grown to a state where the information is internally included within the single transparent gemstone such that it is not physically exposed to elements outside an outer surface of the single transparent gemstone,
the information comprises at least a private key, a public key, and an address; and
a computing device configured to execute instructions that cause the computing device to:
read the information,
validate, via a network and the address, the public key and private key are associated with at least one block on the blockchain, and
present an indication of whether or not the information is validated.

Clause 53. A system comprising:
a tangible token comprising a transparent gemstone, wherein:
the transparent gemstone is internally etched with information pertaining to a blockchain, and the information comprises at least a private key, a public key, and an address, and
the information is encapsulated within a perimeter of the transparent gemstone such that the information does not extend beyond the perimeter; and
a computing device configured to execute instructions that cause the computing device to:
read the information,
validate, via a network and the address, the public key and the private key are associated with at least one block on the blockchain, and
present an indication of whether or not the information is validated.

Clause 54. The system of any clause herein, wherein the computing device is configured to use optical character recognition to read the information.

Clause 55. The system of any clause herein, wherein:
the transparent gemstone comprises an internal etching produced by etching with a laser a visual representation of the information pertaining to the blockchain, such that the information is internally included within the transparent gemstone, and the internal etching is not physically exposed to elements outside an outer surface of the transparent gemstone.

Clause 56. The system of any clause herein, wherein:
the transparent gemstone comprises an internal etching produced by etching with a laser a visual representation of the information pertaining to the blockchain and a graphic image.

Clause 57. The system of any clause herein, wherein the transparent gemstone comprises a precious stone.

Clause 58. The system of any clause herein, wherein the transparent gemstone comprises sapphire.

Clause 59. The system of any clause herein, wherein the information pertains to a non-fungible token stored on the blockchain.

Clause 60. The system of any clause herein, wherein the information pertains to a cryptocurrency transaction instruction stored on the blockchain.

Clause 61. The system of any clause herein, wherein the information further comprises a graphic design, text content, an image, a logo, a symbol, a character, or some combination thereof.

Clause 62. The system of any clause herein, wherein the information is associated with a block of cryptocurrency stored on the blockchain, wherein the block of cryptocurrency represents a number of units of the cryptocurrency, and wherein the information further comprises an identifier associated with the cryptocurrency.

Clause 63. A method comprising:
internally etching, within a transparent gemstone, machine-readable information pertaining to a blockchain, wherein the information comprises at least a private key, a public key and an address of the blockchain;
reading, using a sensor of a computing device, the machine-readable information;
validating, via a network and the address, that the public key and the private key are associated with at least one block on the blockchain; and presenting an indication that the information is validated.

Clause 64. The method of any clause herein, wherein the computing device is configured to use optical character recognition to read the information.

Clause 65. The method of any clause herein, wherein the information pertains to a non-fungible token stored on the blockchain.

Clause 66. The method of any clause herein, wherein the information pertains to a cryptocurrency transaction instruction stored on the blockchain.

Clause 67. The method of any clause herein, wherein the information further comprises a graphic design, text content, an image, a logo, a symbol, a character, or some combination thereof.

Clause 68. The method of any clause herein, further comprising attaching the transparent gemstone to a piece of jewelry.

Clause 69. The method of any clause herein, wherein the method further includes
projecting, on a surface, an image associated with a non-fungible token accessed on the blockchain.

Clause 70. The method of any clause herein, further comprising sealing the transparent gemstone in an opaque material such that the information is not visible.

Clause 71. The method of any clause herein, wherein the information is associated with a block of cryptocurrency stored on the blockchain, wherein the block of cryptocurrency represents a number of units of the cryptocurrency, and wherein the information further comprises an identifier associated with the cryptocurrency.

Clause 72. The method of any clause herein, wherein the number of units are associated with a transaction value, and the method further comprises:
using a processing device to generate a transaction on the transaction value; and
storing a result of the transaction in a digital wallet.

Clause 73. The method of any clause herein, wherein the transparent gemstone is registered on the blockchain to a first owner, and the method further comprises using a processing device to transfer ownership of the transparent gemstone on the blockchain to a second owner.

Clause 74. A tangible, non-transitory computer-readable medium storing instructions that, when executed, cause a processing device to:
internally etch, within a transparent gemstone, machine-readable information pertaining to a blockchain, wherein the information comprises at least a private key, a public key and an address of the blockchain;
read, using a sensor, the machine-readable information;
validate, via a network and the address, that the public key and the private key are associated with at least one block on the blockchain; and
present an indication that the information is validated.

Clause 75. The non-transitory computer-readable medium of any clause herein, wherein the instructions further cause the processing device to use optical character recognition to read the information.

Clause 76. The non-transitory computer-readable medium of any clause herein, wherein the information pertains to a non-fungible token stored on the blockchain.

Clause 77. The non-transitory computer-readable medium of any clause herein, wherein the information pertains to a cryptocurrency transaction instruction stored on the blockchain.

Clause 78. The non-transitory computer-readable medium of any clause herein, wherein the information further comprises a graphic design, text content, an image, a logo, a symbol, a character, or some combination thereof.

Clause 79. The non-transitory computer-readable medium of any clause herein, wherein the instructions further cause the processing device to project, on a surface, an image associated with a non-fungible token accessed on the blockchain.

Clause 80. The non-transitory computer-readable medium of any clause herein, wherein the information is associated with a block of cryptocurrency stored on the blockchain, wherein the blockchain represents a number of units of the cryptocurrency, and wherein the information further comprises an identifier associated with the cryptocurrency.

Clause 81. The non-transitory computer-readable medium of any clause herein, wherein the number of units are associated with a transaction value, and wherein the instructions further cause the processing device to:
generate a transaction on the transaction value; and
store a result of the transaction in a digital wallet.

Clause 82. The non-transitory computer-readable medium of any clause herein, wherein the transparent gemstone is registered on the blockchain to a first owner, and wherein the instructions further cause the processing device to transfer ownership of the transparent gemstone on the blockchain to a second owner.

What is claimed is:

1. A system comprising:
a tangible token comprising a transparent gemstone, wherein:
the transparent gemstone is internally etched with information pertaining to a blockchain, and the information comprises at least a private key, a public key, and an address, wherein the information is associated with a block of cryptocurrency stored on the blockchain, the block of cryptocurrency represents a number of units of the cryptocurrency, and the information further comprises an identifier associated with the cryptocurrency, and
the information is encapsulated within a perimeter of the transparent gemstone such that the information does not extend beyond the perimeter; and
a computing device executes instructions that cause the computing device to:
read the information,
validate, via a network and the address, the public key and the private key are associated with at least one block on the blockchain, and
present an indication of whether or not the information is validated.

2. The system of claim 1, wherein the computing device uses optical character recognition to read the information.

3. The system of claim 1, wherein:
the transparent gemstone comprises an internal etching produced by etching with a laser a visual representation of the information pertaining to the blockchain, such that the information is internally included within the transparent gemstone, and the internal etching is not physically exposed to elements outside an outer surface of the transparent gemstone.

4. The system of claim 1, wherein:
the transparent gemstone comprises an internal etching produced by etching with a laser a visual representation of the information pertaining to the blockchain and a graphic image.

5. The system of claim 1, wherein the transparent gemstone comprises a precious stone.

6. The system of claim 1, wherein the transparent gemstone comprises sapphire.

7. The system of claim 1, wherein the information pertains to a non-fungible token stored on the blockchain.

8. The system of claim 1, wherein the information pertains to a cryptocurrency transaction instruction stored on the blockchain.

9. The system of claim 1, wherein the information further comprises a graphic design, text content, an image, a logo, a symbol, a character, or some combination thereof.

10. A method comprising:
internally etching, within a transparent gemstone, machine-readable information pertaining to a blockchain, wherein the information comprises at least a private key, a public key and an address of the blockchain, wherein the information is associated with a block of cryptocurrency stored on the blockchain, the block of cryptocurrency represents a number of units of the cryptocurrency, and the information further comprises an identifier associated with the cryptocurrency;
reading, using a sensor of a computing device, the machine-readable information;
validating, via a network and the address, that the public key and the private key are associated with at least one block on the blockchain; and
presenting an indication that the information is validated.

11. The method of claim 10, wherein the computing device uses optical character recognition to read the information.

12. The method of claim 10, wherein the information pertains to a non-fungible token stored on the blockchain.

13. The method of claim 10, wherein the information pertains to a cryptocurrency transaction instruction stored on the blockchain.

14. The method of claim 10, wherein the information further comprises a graphic design, text content, an image, a logo, a symbol, a character, or some combination thereof.

15. The method of claim 10, further comprising attaching the transparent gemstone to a piece of jewelry.

16. The method of claim 10, wherein the method further includes
projecting, on a surface, an image associated with a non-fungible token accessed on the blockchain.

17. The method of claim 10, further comprising sealing the transparent gemstone in an opaque material such that the information is not visible.

18. The method of claim 10, wherein the number of units are associated with a transaction value, and the method further comprises:
using a processing device to generate a transaction on the transaction value; and
storing a result of the transaction in a digital wallet.

19. The method of claim 10, wherein the transparent gemstone is registered on the blockchain to a first owner, and the method further comprises using a processing device to transfer ownership of the transparent gemstone on the blockchain to a second owner.

20. A tangible, non-transitory computer-readable medium storing instructions that, when executed, cause a processing device to:
internally etch, within a transparent gemstone, machine-readable information pertaining to a blockchain, wherein the information comprises at least a private key, a public key and an address of the blockchain, wherein the information is associated with a block of cryptocurrency stored on the blockchain, the block of cryptocurrency represents a number of units of the cryptocurrency, and the information further comprises an identifier associated with the cryptocurrency;
read, using a sensor, the machine-readable information;
validate, via a network and the address, that the public key and the private key are associated with at least one block on the blockchain; and
present an indication that the information is validated.

21. The non-transitory computer-readable medium of claim 20, wherein the instructions further cause the processing device to use optical character recognition to read the information.

22. The non-transitory computer-readable medium of claim 20, wherein the information pertains to a non-fungible token stored on the blockchain.

23. The non-transitory computer-readable medium of claim 20, wherein the information pertains to a cryptocurrency transaction instruction stored on the blockchain.

24. The non-transitory computer-readable medium of claim 20, wherein the information further comprises a graphic design, text content, an image, a logo, a symbol, a character, or some combination thereof.

25. The non-transitory computer-readable medium of claim 20, wherein the instructions further cause the processing device to project, on a surface, an image associated with a non-fungible token accessed on the blockchain.

26. The non-transitory computer-readable medium of claim 20, wherein the information is associated with a block of cryptocurrency stored on the blockchain, wherein the blockchain represents a number of units of the cryptocurrency, and wherein the information further comprises an identifier associated with the cryptocurrency.

27. The non-transitory computer-readable medium of claim 26, wherein the number of units are associated with a transaction value, and wherein the instructions further cause the processing device to:
generate a transaction on the transaction value; and
store a result of the transaction in a digital wallet.

28. The non-transitory computer-readable medium of claim 26, wherein the transparent gemstone is registered on the blockchain to a first owner, and wherein the instructions further cause the processing device to transfer ownership of the transparent gemstone on the blockchain to a second owner.

* * * * *